United States Patent [19]

Warren et al.

[11] Patent Number: 4,516,201
[45] Date of Patent: May 7, 1985

[54] MULTIPLEXED DATA COMMUNICATIONS USING A QUEUE IN A CONTROLLER

[75] Inventors: Robert G. Warren, Glasgow; Michael A. Robertson, Stirling, both of Scotland

[73] Assignee: Burroughs Corporation, Detroit, Mich.

[21] Appl. No.: 269,058

[22] PCT Filed: Oct. 9, 1980

[86] PCT No.: PCT/GB80/00161
§ 371 Date: May 28, 1981
§ 102(e) Date: May 28, 1981

[87] PCT Pub. No.: WO81/01064
PCT Pub. Date: Apr. 16, 1981

Related U.S. Application Data

[63] Continuation-in-part of Ser. No. 191,467, Sep. 26, 1980, abandoned.

[30] Foreign Application Priority Data

Oct. 9, 1979 [GB] United Kingdom ............... 7935042

[51] Int. Cl.³ ................. G06F 1/00; G06F 5/04; G06F 9/06
[52] U.S. Cl. ......................................... 364/200
[58] Field of Search ... 364/200 MS File, 900 MS File; 360/200 MS File, 900 MS File

[56] References Cited

U.S. PATENT DOCUMENTS

| | | | |
|---|---|---|---|
| 3,328,772 | 6/1967 | Oeters | 364/200 |
| 3,351,917 | 11/1967 | Shimabukuro | 364/900 |
| 3,400,375 | 9/1968 | Bowling et al. | 364/200 |
| 4,071,887 | 1/1978 | Daly et al. | 364/200 |
| 4,168,532 | 9/1979 | Dempsey et al. | 364/900 |

Primary Examiner—Harvey E. Springborn
Attorney, Agent, or Firm—David G. Rasmussen; Kevin R. Peterson; Edmund M. Chung

[57] ABSTRACT

A data communications controller, for use intermediately between a data processor and a data communications link such as a modem driven land line, relieves the data processor of time-consuming supervisory and data preparation tasks, normally associated with the use of a data link, by means of a block loadable transmit queue, an automatic cyclic redundancy check generator, an automatic time fill generator and a parity generator, a block unloadable receive queue, an automatic character translator, an automatic character monitor and a received serial bit queue in conjunction with a byte synchronizing detector, the operation or non-operation of each of the above elements and, if operational, the manner of that operation, being selectable by commands from the data processor, the commands from the data processor being intermingled with but distinguishable from data to be sent over the data link.

19 Claims, 13 Drawing Figures

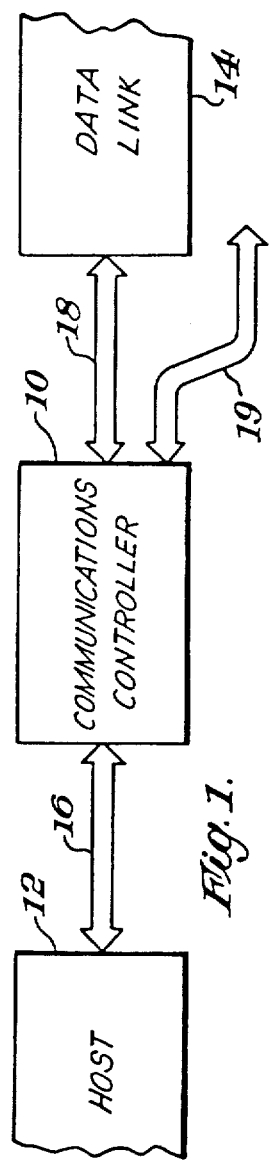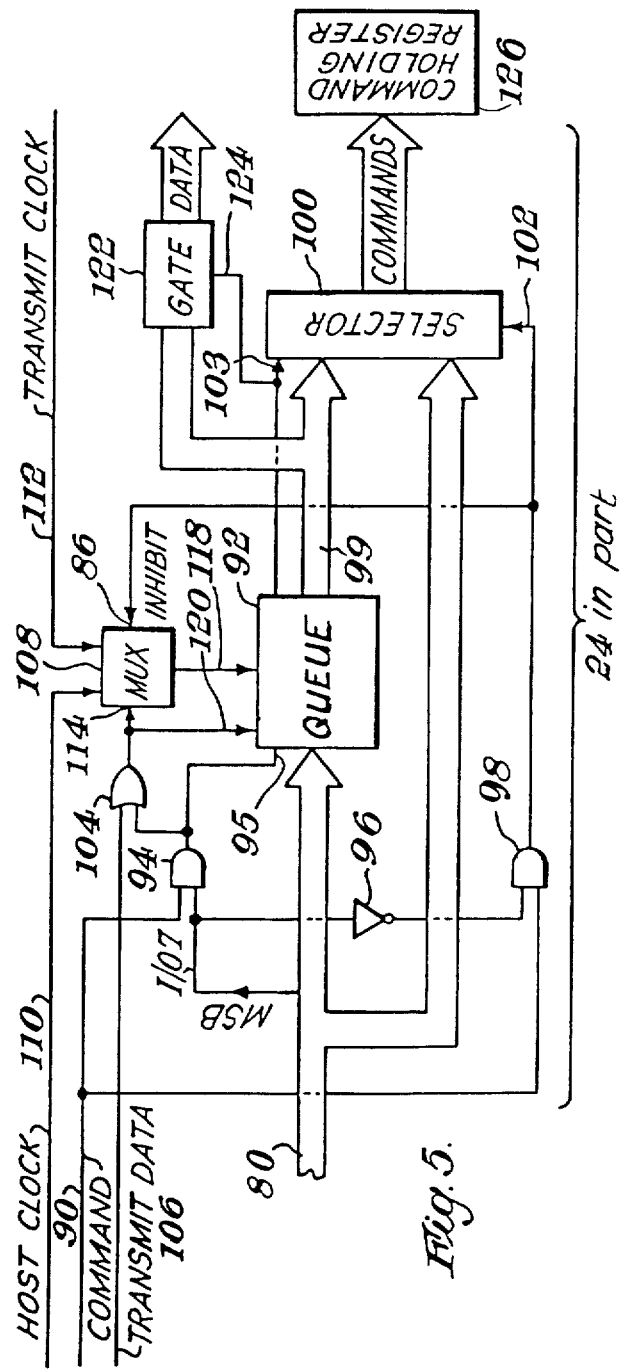

MULTIPLEXED DATA COMMUNICATIONS USING A QUEUE IN A CONTROLLER

CROSS-REFERENCES TO RELATED APPLICATIONS

This application is a continuation-in-part of application Ser. No. 191,467, filed Sept. 26, 1980 and now abandoned.

BACKGROUND OF THE INVENTION

Field of the Invention

The present invention relates to a communications controller for data storage and processing intermediately between a data-processing host and a data communications link, and it is an object of the present invention to provide a controller having flexibility of operation and requiring minimal host supervision.

It is well known in the art to provide data communications between mutually remote data processing systems via modulated carrier landline links, radio links or direct wire connection, using any one of a plurality of well known codes and of well known protocols.

It is usual that a data link comprises a modulator/demodulator (hereinafter referred to as a modem) at either end each under the control of their respective host. The host originating a message provides that message, pre-coded and complete with error-checking characters, bit-by-bit to the transmitting modem. The coding of the message, the insertion of error-checking characters, and the servicing of the modem once for every transmitted bit impose a taxing burden on the host, taking up much operating time that would more profitably be spent on other tasks and ruining the continuity of the execution of other tasks by frequent interruptions. In the extreme case, small or slow hosts may possess insufficient processing capacity or speed of execution to fulfil the various coding, error character generation, and modem servicing requirements between successive demands by the modem for a fresh transmission bit, leading not only to a complete abandonment of alternative task execution but also to a failure in the data on the data link itself.

A host in receipt of a data communications message receives that message bit-by-bit from the modem and is subject to bit-by-bit interruption, decoding and error checking character verification requirements. The receiving host is thereby no better off than the transmitting host.

An additional disadvantage in current data communications methods is the large amount of manpower, time and memory space consuming software required to be written for each host, especially in those hosts which may be asked to communicate using a plurality of protocols and codes.

A host is rarely linked directly to a modem. An interface of some kind is usually provided therebetween. Current interfaces are generally code and protocol specific. As it is increasingly the case that a processor is expected to communicate with more than one remote system, and that different systems observe different protocols and codes, the number and consequent expense of the required plurality of interfaces increases.

In certain so-called synchronous modes of transmission it is a requirement on the receiving host that it knows in advance the beginning bits of each byte. It is a deficiency in the current art that should that information be lost there is no method of recovery from that loss.

It is the current trend that a plurality of processors or small size and/or data terminals of limited processing capacity are provided together on one site, such as a factory, and are required to communicate not only with one another, but also with remote equipment at other sites such as a head office or another factory. It is generally the case that almost the entire operation of a supervisory processor is required to be sacrificed in order to achieve this aim.

It is therefore desirable to provide means whereby a host may conduct data communications with any one of a plurality of remote or local systems under conditions of minimal processing requirements. It is further desirable that apparatus be provided for automatic byte-synchronisation of synchronously received, plural-bit characters.

SUMMARY OF THE INVENTION

According to one aspect, the present invention consists in a data communications controller, for use intermediately between a data processor and a data communications link, characterised by said controller being operable, in response to commands from said processor, to receive data characters from said processor, and to encode and supply supplementary characters to said data characters for serial transmission by said communications link in any selectable one out of a plurality of transmission modes and according to any selectable one out of a plurality of transmission protocols.

According to another aspect, the present invention consists in a data communications controller, for use intermediately between a data processor and a data communications link, characterised by said controller being operable, in response to commands from said processor, to receive serial binary characters from said communications link, to decode said serial binary characters, to check the validity of and delete supplementary characters contained therein, and to present the result of said operations as received data to said processor.

According to another aspect, the present invention consists in a controller, for use intermediately between a data processor and a data communications link, comprising; a plural character data store for receiving a serial succession of characters for transmission from said data processor, and for yielding up said stored characters, to said data link, in the same serial order as that of their receipt, and also comprising a monitor for monitoring the number of characters stored in said data store which have not yet been yielded up to said data link and for providing indication of said number to said data processor.

According to another aspect the present invention consists in a controller, for use intermediately between a data processor and a serial data link, comprising, a first-in first-out register for receiving a succession of binary digits, representative of a plurality of plural binary digit characters, from said data link and operable to yield up said succession of binary digits to be coupled to said data processor.

According to another aspect, the present invention consists in a controller, for use intermediately between a data processor and a serial data link, comprising a first-in first-out register for receiving a succession of binary digits from said data link and operable to yield up said succession of binary digits to be coupled to said data processor, and a monitor for monitoring the output of said register and for providing indication when a predetermined serial pattern of binary digits is presented at the output of said shift register.

According to another aspect, the present invention consists in a controller, for use intermediately between a data processor and a data communications link, comprising a store for receiving and storing a plurality of plural binary digit data characters derived from said data communications link and operable to yield up for coupling to said data processor, said plurality of characters in the same serial order as that of their receipt from said data link and a monitor for monitoring the number of characters in said store which have not yet been so yielded up and for providing indication of said number to said data processor.

According to another aspect, the present invention consists in a controller, for use intermediately between a data processor and a data link comprising a monitor for monitoring data characters received from said data link and for providing indication when any one out of a plurality of predetermined characters is so received.

According to another aspect, the present invention consists in a controller, for use intermediately between a data processor and a data communication link, comprising a translator for monitoring data characters received from said data link and for substituting, for coupling to said data processor, a predetermined one out of a plurality of predetermined substitution characters whenever a corresponding one out of a corresponding plurality of predetermined data characters is so received.

According to another aspect, the present invention consists in a controller, for use intermediately between a data processor and a data communication link, comprising a store for receiving and storing a serial plurality of mixed data characters for transmission by said data link and command characters not for transmission by said data link, operable to yield up said mixed characters in the same serial order as that of their receipt, and a separator for separating said data characters from said command characters as they are yielded up by said store.

According to another aspect, the present invention consists in a controller, for use intermediately between a data processor and a data communications link comprising a cyclic redundancy check generator for supplying cyclic redundancy check characters to the data, supplied by said processor to said controller for transmission.

According to another aspect, the present invention consists in a controller, for use intermediately between a data processor and a data communications link comprising a cyclic redundancy character checker for checking and deleting cyclic redundancy check characters received from said data Link.

According to another aspect, the present invention consists in any of the above aspects taken singly or in combination.

BRIEF DESCRIPTION OF THE PREFERRED EMBODIMENT

In a preferred embodiment, the controller comprises a first-in first-out serial transmission queue for accepting a burst of one or more parallel bit words from the processor, storing a plurality of said words and delivering up said words in the same serial order as that of their acceptance for transmission purposes. The transmission queue preferably comprises a monitor for monitoring the state of fulness of the queue and for providing indication of said state of fulness to said processor. The transmission queue is preferably operable to store commands, intermixed randomly with said words, for execution by the controller as they are delivered up from the transmission queue, in which case the transmission queue preferably comprises a separator for separating commands from data for transmission.

The controller preferably comprises a cyclic redundancy check generator for calculating and adding cyclic redundancy check characters to data for transmission. The generator preferably operates on the parallel bit words emerging from the transmit queue. The polynomial used by the generator is preferably selectable by the processor.

The controller preferably comprises a parallel-to-serial converter for converting parallel-bit data words for transmission into an equivalent serial data stream suitable for transmission over a data link. The operation of the parallel-to-serial converter is preferably selectable, by the processor, as to word length.

The controller preferably comprises a parity bit generator for adding parity bits to the succession of transmission data characters. The parity bit generator is preferably selectably operable, and when operational, selectable as to whether it inserts odd or even parity bits.

The controller preferably comprises a serial reception first-in first-out queue for accepting a plurality of serial bits, representative of received characters and for yielding them up, in the same serial order as that of their acceptance, to be coupled as received data to the processor. The serial reception queue preferably comprises a monitor for monitoring the contents of the queue and for providing indication to the processor when a predetermined plural-bit processor selected character is about to emerge therefrom. The serial reception queue also preferably comprises an indicator for indicating to the processor the state of fulness of the queue.

The controller preferably comprises a serial-to-parallel converter for converting the serial bit stream of characters from the data link into parallel words of processor selectable length. The serial-to-parallel converter is preferably responsive to the output of the monitor of the receive serial queue to control the framing of its own output.

The controller preferably comprises a second CRC generator for checking and deleting cyclic redundancy check characters from the stream of received data from the data link, and for indicating to the processor when an error is detected. The polynomial used by the second CRC generator is preferably processor selectable. The second CRC generator is preferably embodied as all or part of the cyclic redundancy check generator for transmission characters.

The controller preferably comprises a search monitor for comparing incoming, received characters with a processor-selected list of predetermined characters and for providing indication when a match is found.

The controller preferably comprises a translator for changing any incoming received data word, if it matches with any member of a list of processor selected words, into a corresponding processor-selected substitution word.

The controller preferably comprises a receive first-in first-out queue for accepting and storing a plurality of parallel binary digit words and for delivering up said words in the same serial order as that of their acceptance, in bursts of one or more successive words, to the processor, as received and processed data. The receive queue preferably comprises a monitor for indicating to the processor the state of fulness of the queue.

The controller is preferably coupled to the processor by a bus comprising a data bus for data and command characters and a control bus for indicating the nature of the character on the data bus.

The controller preferably comprises external equipment control means whereby the processor may send digital instructions to and receive digital feedback from external equipment, preferably an automatic dialling unit.

The controller is preferably implemented using plural LSI integrated circuits, preferably three, in which case the integrated circuits are coupled together for character transfer therebetween and to the processor by the data bus already described. The control bus preferably is applied to only one of the integrated circuits, in which case that one integrated circuit controls access of the others to the data bus by supplying, to the others, a modified control bus under the control of that one integrated circuit.

The controller preferably comprises one or more processor selectable period timers which are operable to start their operation in response to a command from the processor and to indicate to the processor the termination of their respective timing operations.

The controller preferably comprises a processor selectable period data timer which starts its operation on receipt of each binary digit from the data link and indicates to the processor if another binary digit is not so received within the selected time.

The processor preferably controls the controller by preloading control characters into selectable control registers which are selectably readable by the processor. The controller preferably signals indications of internal conditions back to the processor by controlling flag signals in one or more, processor readable status registers.

All signal processing elements are preferably testable by the processor.

The controller preferably operates at a processor selectable baud rate.

The output coupling of the controller preferably comprises two or more selectably controller usable buses any one of which can couple the controller to a data link or be used for communications with another controller.

The invention is further described, by way of an example, by the following description in conjunction with the appended drawings, in which:

DESCRIPTION OF THE DRAWINGS

FIG. 1 shows the data communications controller coupled intermediately between a host system and a data link;

FIG. 5 shows a first part of the transmit queue of FIG. 2;

DESCRIPTION OF THE PREFERRED EMBODIMENT

Figure 2:
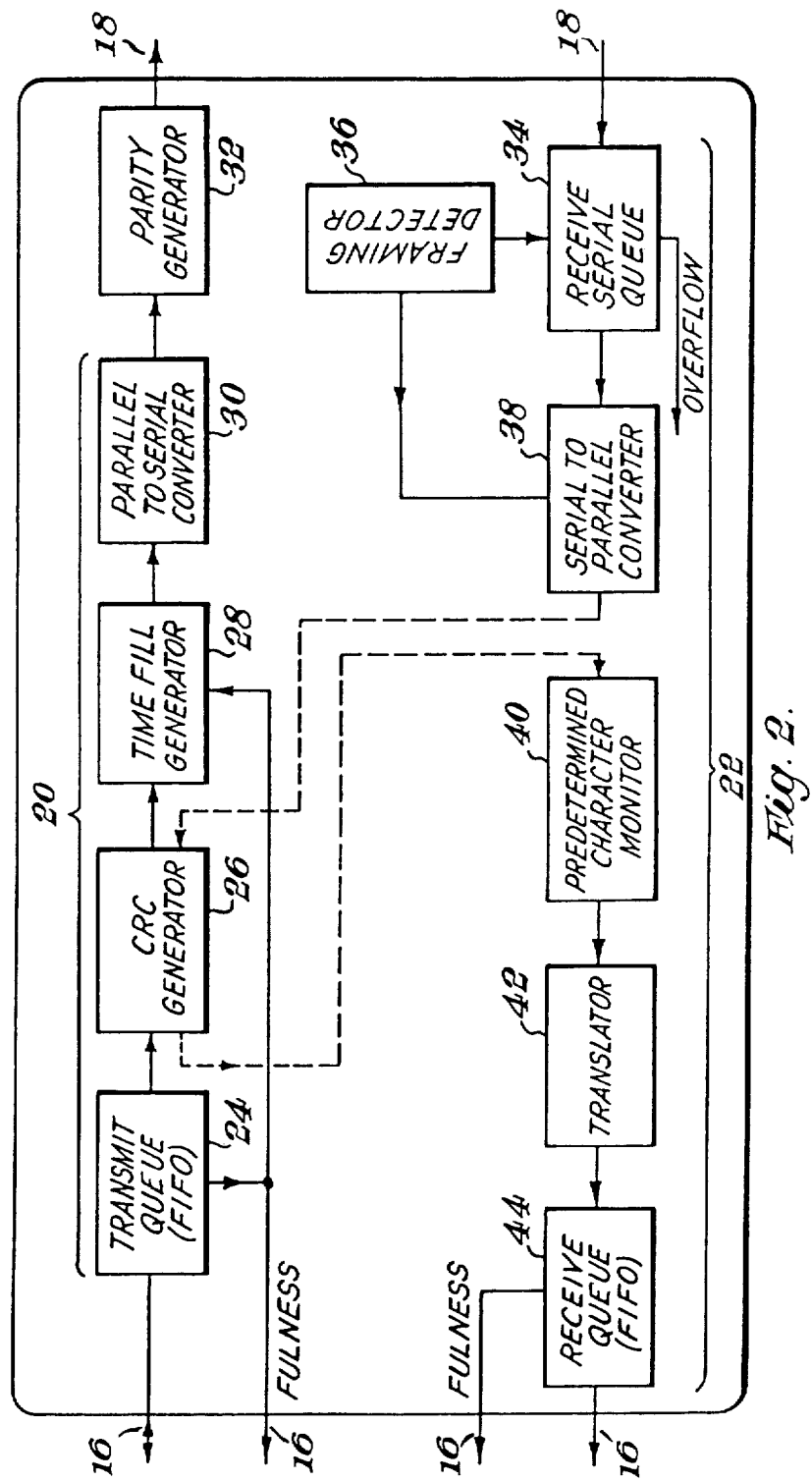
FIG. 2 shows the principal data processing elements in the controller.

FIG. 1 shows the communications controller 10 coupled intermediately between a host system 12 and a data link 14. The host 12 is bidirectionally coupled to the controller 10 by the host bus 16. The controller 10 is bidirectionally coupled to the data link 14 by the data link bus 18.

The host 12 passes data to be transmitted by the data link 14, data processing instructions for the controller 10 and reference characters for use by the controller 10 to the controller 10, in the form of a succession of parallel digital words. The controller 10 turns parallel data to be transmitted into serial data, having processed it according to instructions from the host 12. The processed serial data is then coupled to the data link 14 for sending to some remote data processing system. The controller 10 decodes any instructions from the host 12 which may be destined for the data link 14 and passes them thereto in a form suitable for the control of the link 14.

When the link 14 receives serial data characters from some remote data processor, the controller 10 receives the serial string of characters, processes them in accordance with earlier host 12 instructions and presents them as a succession of parallel digital words, to the host 12 via the host bus 16. The controller 10 is operable to provide the host 12 with status information concerning the data link 14, to inform the host 12, to take action when predetermined characters are received, to automatically generate the the protocol characters required when transmitting and eliminate such characters when receiving.

The host 12 may comprise any form of data processing equipment, but typically will be a digital computer. The data link 14 may comprise any form of remote data signalling device, such as a modem driven landline, a radio link, or even a direct-wire system.

The controller 10 accepts bursts of parallel transmission data words from the host 12 and controls the timing of the transmission of their serial data equivalents to relieve the host 12 of the necessity of supervising the presentation of each word to the data link 14. Similarly, the controller 10 stores received serial data as a succession of parallel data words for subsequent presentation to the host 12 when the host 12 requests it, so relieving the host 12 of attending to the receipt of each individual character from the data link 14. In addition the controller 10 supplies error checking characters to transmitted data and checks these characters in received data. The controller 10 is also operable to translate received characters into an alternative, host-loaded code, is further operable to synchronise the framing of incoming serial data whose word boundaries are uncertain, and is yet further operable to buffer store incoming, received data as a serial string for later processing. In these, and other ways which will later become apparent, the controller 10 relieves the host 12 of time and program consuming tasks, allowing the the host 12 to operate with improved time-utilisation efficiency. In addition, host systems 12 where memory size, data handling capacity or speed limitations would otherwise preclude their joining to a data link 14, may be so joined via the controller 10 by virtue of the simplification of host 12 task requirements which the controller 10 allows.

The controller 10 may also be linked to one or more host systems, via one or more controllers 10. A secondary, bidirectional external coupling 19 allows ancillary equipment to be controlled and monitored by the host 12.

FIG. 2 shows, in schematic form, a generalisation of the data flow through the communications controller 10.

The data flow may be divided into two paths, a first path 20 being for data characters, originating from the host 12 for transmission by the data link 14, and a second path 22 for characters, received from the data link 14 and destined for the host 12. Characters to and from the host 12 are in 8 bit parallel format. Characters sent to and received from the data link 14 are in serial form.

Data for transmission by the host 12, together with commands for the communications controller 10, is provided as input to the transmit queue 24. The transmit queue 24 is a 32 byte long first-in-first-out register, clocked by the host 12 for insertion of data and commands and for removal of commands, and at a rate conforming to the operational speed of the data link 14 for removal of data for transmission. Data is separated from commands at the output of the transmit queue 24. Indication of the state of fullness of the transmit queue 24 is provided.

The output of the transmit queue 24 is provided as the input to a cyclic redundancy check generator 26 which is operable to divide the incoming stream of 8-bit parallel data characters by a selectable, predetermined, irreducible polynomial and to include the remainder resulting from that division as an additional character to be transmitted when commanded to do so. Having added the remainder, the generator 26 starts again dividing the following streams of data characters.

After the addition of the cyclic redundancy check remainders, the data for transmission is provided as an input to a time fill generator 28. The time fill generator 28, whenever no data characters are available for transmission, that is, when the transmit queue 24 is empty, is selectably operable to provide, as characters for transmission, a selectable repetition of one, or another, or combinations of two timefill data characters preloaded from the host 12 to ensure continuity of transmission.

The timefill characters having been selectably added, the 8-bit parallel data characters pass as input to a parallel-to-serial converter 30 which converts the 8-bit parallel data words to a selectable by 5-bits or by 8-bits serial data stream.

The output of the serial to parallel converter 30 is coupled as a stream of binary digits for transmission to the data link 14, via a parity generator 32 which is selectably operable to provide selectably odd or even parity bits. The parity generator 32 need not operate on the serial data stream from the parallel-to-serial converter 30, but can equally well be included between the time-fill generator 28 and the converter 30 to operate on parallel words.

In the reception path 22, a serial stream of binary digits is received from the data link 14. The serial stream is provided as the input to a receive serial queue 34. The receive serial queue 34 is a 256-bit long first-in first-out register enabling the communications controller 10 to receive bursts of data from the data link 14. The queue 34 indicates to the host 12 if it is over-filled.

The output of the serial queue 34 is monitored by a framing detector 36. The framing detector 36, examines the next 24 bits about to emerge from the serial queue 34 and compares them selectably in whole or in part, with a predetermined pattern preloaded into the detector 36 by the host 12. The preloaded pattern may be, for example, a time fill character. When a match is found the detector 36 provides output indicative thereof. Once a complete, pre-ordained character has been recognised by the detector 36 the communications controller 10 knows where bytes in the serial data from the data link 14 begin and end and which byte is which in the serial succession of bytes.

Serial binary digits, emerging from the serial receive queue 34 are provided as input to a serial-to parallel converter 38 which is operable to turn its serial input into selectably 5-bit or 8-bit parallel words, having reference to the indication provided by the framing detector 36.

The output of the serial-to-parallel converter 38 is coupled as an input to the CRC generator 26 also used in the transmit path 20. The CRC generator 26 works just as before, except this time, when commanded, it compares its calculated remainder with the incoming remainder word, discards the received remainder word, and signals an error condition to the host 12 if there is any difference therebetween.

The parallel characters, coming back from the CRC generator 26, are coupled as an input to a predetermined character monitor 40. The monitor 40 contains a list of predetermined characters, previously loaded therein by the host 12. The monitor 40 is selectably operable to compare the data word coming in from the CRC generator 26 with the characters in its list. If a match is found, the generator 40 is selectably operable to discard that character, for example time-fill characters, or to signal to the host that some match has been found within the received data stream. As an example of the utility of such a feature, it may be that, on discovery of a certain match, the host 12 knows that the mode or rate of received data is to change and issues instructions to the communications controller 10 accordingly.

The output of the character monitor 40 is identical with its input (i.e. a serial stream of parallel bit received characters) and is provided as the input to a translator 42. The translator 42 contains a predetermined search list, loaded beforehand from the host 12, of characters it is to look out for together with a corresponding predetermined list, also loaded from the host 12, of substitution characters. The translator 42 compares each character it receives from the monitor 40 with the search list and, if a match is found, provides the corresponding character, from the substitution list, in its place. The translator 42 thus provides, as its output, its input character if no match is found in the search list, and a substituted character from the substitution list if a match is found. The operation or non-operation of the translator 42 is selectable. When used, it allows code translation of some or all of the characters received from the monitor 40.

It is not necessary that the monitor 40 precede the translator 42. The reverse order may be adopted, in which case the monitor 40 may react to a match which is a result of a character substitution by the translator 42.

The output of the translator 42 is coupled as an input to a receive queue 44, a 32-byte long first-in first-out register for storing received and processed characters until the host 12 is ready to accept them. The receive queue 42 works in substantially the same manner as the transmit queue 24, with the exception that characters are loaded into the receive queue 44 at a rate consistent with the operation of the data link 14, and unloaded therefrom at a rate consistent with the operation of the host 12. The reverse of the rates pertaining in the transmit queue 24.

A receive parity checker, selectably operable to check and discard selectably odd or even parity bits in the received data, not shown in FIG. 2, is included in the reception path 22 between the receive data queue 34 and the serial-to-parallel converter 38. With simple modification to the serial-to-parallel converter 38, it might be included thereafter.

The elements so far described cover only the major features of the communications controller. Other features therein will become apparent from the following description.

Before progressing to a description of the individual elements of FIG. 2, it is necessary to include a description of the overall structure of the communications controller 10 in that it affects the style of their implementation.

Figure 3:
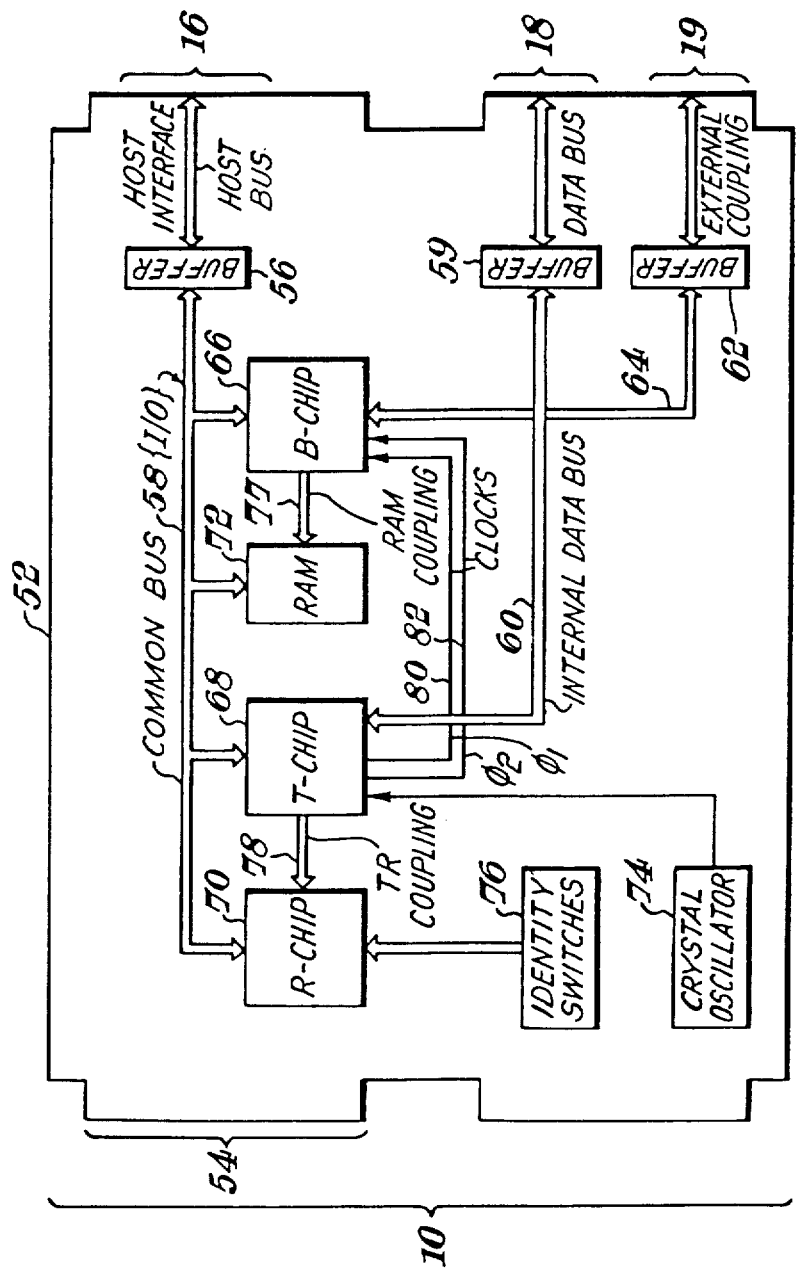
FIG. 3 shows the physical implementations and element intercouplings of the controller.

FIG. 3 shows a schematic layout of the communications controller 10.

The controller 10 is built on a single circuit board 52. At one end of the board 52 edge connectors are provided for the host bus 16, the data link bus 18, and the external coupling 19. At the other end of the board 52 test points 54 are provided.

The host bus 16 communicates bidirectionally with the controller 10 via the host bus buffer 56, which couples the host bus 16 to the common bus 58.

The data link bus 18 is bidirectionally coupled to the controller 10 via the data link buffer 59 which couples the data link bus 18 to the internal data bus 60.

The external coupling 19 is bidirectionally coupled to the controller 10 via the external coupling buffer 62 which couples the data coupling 19 to the internal data coupling 64.

The controller 10 comprises a byte-processing LSI integrated circuit 66, hereinafter called the B-chip, a transmission-controlling LSI integrated circuit 68, hereinafter called the T-chip, a reception controlling LSI integrated circuit 70, hereinafter called the R-chip, a random access memory 72, hereinafter called the RAM, a crystal oscillator clock generator 74, and identity switches 76 by means of which the controller 10 may be given a unique identity.

The common bus 56 communicates bidirectionally with the RAM 72, the B-chip 66, the T-chip 68 and the R-chip 70. The B-chip 66 communicates, for data retrieval purposes, with the RAM 72, via the RAM coupling 74.

The internal data coupling 64 is coupled, bidirectionally, to the B-chip 66. The internal data bus 60 is coupled, bidirectionally, to the T-chip 68. The output of the crystal oscillator 74 is coupled as an input to the T-chip 68. The digital word, representing the address of the controller 10, which is selectable by means of the identity switches 46, is coupled as an input to the R-chip 70. The T-chip 68 is coupled to the R-chip 70, for passing signals thereto, by the T-R coupling 78.

The T-chip 68 processes the output of the crystal oscillator 74 to provide first and second clock signals on first and second clock couplings 80,82 for the control of the B-chip 66, and of the R-chip 68.

The R-chip 70, the T-chip 68, the RAM 72 and the B-chip 66 are operable not only to communicate with the host 12 via the common bus 58, but also with one another, not interfering with the host 12 because of the isolation therefrom offered by the host bus buffer 56.

The operations of the B-chip 66, the T-chip 68 and the R-chip 70 are now described in general terms to be explained in more detail thereafter.

The B-chip 66 contains the transmit queue 24, the CRC generator 26, the character monitor 40, the translator 42 and the receive queue 44.

As stated earlier, the B-chip 66 is a byte-processing unit. During data transmission it loads characters for transmission, together with associated commands, both received from the host 12, into the 32 byte first-in first-out queue 24, separates commands from data, and presents the data characters one-by-one to the T-chip 68 as the T-chip 68 requires. The B-chip 66 indicates to the host 12 when the queue 24 of transmission characters is empty, half empty or full so that the host 12 may supply further characters. The commands, separated from the data characters, are presented appropriately to itself (the B-chip 66), the T-chip 68 or the R-chip 70 as they appear at the end of the FIFO queue 24. During transmission the B-chip 66 computes the cyclic redundancy check character (CRC) for addition to the end of the string of transmission characters.

During data reception the B-chip 66 reads received characters from the R-chip 70, as the R-chip 70 requires, together with any status characters. The B-chip 66 is operable to perform the code translation of received characters using the RAM 72 as a lookup table. The B-chip 66 is further operable to compare the received character, or the translated character resulting from the code-translation performed thereon, with a list of characters stored in the RAM and, in response to a match is operable to provide indication to the host 12 of the discovery of a match, to compute the CRC remainder and compare it with that received, to load characters into the 32 byte long FIFO queue of received characters 44, to discard time-fill characters, to discard the received character, or where appropriate, to code translate. The B-chip 66 indicates to the host 12 when the 32 byte-long queue 44 of received characters is full, half full or empty so that the host 12 may regulate its demand for characters from the controller 10. Indication may also be given to the host 12 that a match has been found, that a character is the first character following a predetermined FLAG character in certain received data formats, that a parity error has occurred in the received data, that the received data is not properly framed, that a predetermined termination character has been received, that an ABORT command has been received, an IDLE command has been received, or, in the event of signal loss, the reason for that loss.

The B-chip 66, as well as byte processing, is operable to receive a special command from the host 12 to lock out the reception of further commands, and to indicate to the host 12 when timers have timed out in the T-chip 68 or the status of the data link 14 has changed, as sensed by the T-chip 68.

The T-chip 68 contains the parallel-to-serial converter 30, the parity generator 32, the time fill generator 28, and clock generation circuits.

The T-chip 68 is the transmission control element. It converts the parallel data transmission characters from the B-chip 66 into serial data for transmission according to a selectable 5-bit long or 8-bit long byte, and automatically inserts parity bits therein. The T-chip 68 can be selected to operate in a manner suitable for communication via an asynchronous data link 14, in which case the T-chip 68 automatically inserts start bits into the serial transmission data stream and also automatically inserts stop bits therein of a selectable 1, 1½ or 2 bit period duration. The T-chip 68 can also be selected to operate suitably for use with a synchronous data link 14, in which case the T-chip 68 automatically provides time fill characters (preloaded from the host 12) of, selectably, one or two character length, for transmission, when no data characters are available to be sent, and indicates to the B-chip 66 that a time fill character has been sent. The T-chip 68 can further be selected to operate suitably for use with a data link 12 using BDLC protocol, in which case the T-chip 38 automatically inserts a zero after each five successive ones, automatically provides, for transmission, FLAG or ABORT characters in a time-fill situation, when it waits in an ABORT condition and indicated to the host 12 until released by the host 12.

The T-chip 68 is operable to delay the dropping of a transmission enabling signal by a selectable 0, 2, 3 or 4 bit-periods so that the data link 14, turned off at the start of the delay, has time to go into receive mode.

It is the T-chip 68 that clocks data out to the data link 14 at the selected baud rate. The data may selectably be converted, prior to sending to the data link 14, into zero complementing NRZI format.

On the T-chip 38 the output of the crystal oscillator 74 is divided by a selectable number to provide the baud rate clock, and by a predetermined number to provide a 1 KHz clock for timing purposes. The 1 KHz clock is used by two general purpose timers which may be programmed for timeout periods between 1 millisecond and 65.5 milliseconds.

Command signals for the data link 14 are stored in a register on the T-chip 38. Status signals from the data link 14 can be selectably masked by the T-chip 68 to cause interrupts to the host 12 when any status signal from the data link 14, changes, rises or falls. Those status signals from the data link 14 which are required by the R-chip 70 are routed thereto via the T-chip 68. The T-chip 68 can also manipulate the data link 14 signals to provide concatenation, wrap around or monitoring facilities. When the controller 10 is receiving data, the T-chip 68, when reception is asynchronous or isosynchronous, generates the clock signal necessary for data reception. In addition, when the received data is in zero complementing NRZI format, the T-chip 68 is operable to convert it to NRZ.

The R-chip 70 contains the receive serial queue 34, the framing detector 36 and the serial-to parallel converter 38.

The R-chip 70 is the reception controlling element. Firstly, it loads received characters from the data link 14 in the 256 bit long FIFO serial data queue 34, and converts them, as they are presented at the output of the queue, into selectable 5-bit or 8-bit parallel form. When reception is in asynchronous mode, the R-chip 40 detects and indicates framing errors. When reception is in synchronous mode, the R-chip 70 automatically byte synchronises on a predetermined character, and detects and indicates individual or pairs of time-fill characters to be discarded by the B-chip 66. When reception is in BDLC mode, the R-chip 70 automatically byte-synchronises on the FLAG character, indicates the first character after the FLAG character, automatically, deletes the zero following five consecutive received ones, indicates the first occurrence of the TERMINATION FLAG, indicates the occurrence of the ABORT condition, and indicates whether or not data characters are being received whenever requested to do so.

The R-chip 70 allows no new characters to enter the 256 bit serial, received data FIFO queue 34 when the carrier is lost, when the queue is full, or when an illegal signal has been received. The R-chip 70 indicates, to the host 12, the act of sealing and reason for sealing the queue.

A general purpose timer is provided on the R-chip having a selectable period and triggered by the received data characters. The timer is automatically re-armed by the R-chip 70 to measure inter-character gaps. Indication is provided if the preselected gap is exceeded.

The RAM 72 is incorporated into the working of the character monitor 40 and of the translator 42.

The RAM 72 is addressed and controlled by the B-chip 66. It is divided into two functions. Firstly, it holds 256 characters for comparison against received characters from the data link 14. Secondly, it holds a 256 character lookup table for code translation of received characters.

The identity switches 76 provide 4-bits towards the controller identity and a further 8-bits towards an optional terminal address when a read switch command is being executed.

The controller 10 is provided with lamp driving circuits for indicating to the system operator the act of transmitting data, the act of receiving data, and the presence of a carrier.

FIG. 3 shows a schematic block diagram of the B-chip 66 with respect to data and control signal flow therethrough.

Data commands and signals are sent to and from the B-chip 66 via the common bus 58, which comprises an eight bit data bus 80 together with a line control bus 82. The data bus 80 is operable to transfer digital words, being received data, data for transmission, commands for the controller 10 or status readout from the controller 10, to and from the host 12. The control bus 82 is operable to signify the nature of the 8-bit word present on the data bus 80 to indicate to the controller 10 when the host 12 is performing some function, to which the controller 10 must respond, and to indicate to the host 12 when the controller 10 requires attention therefrom. The control bus 82 is able to signify whether the word on the data bus 80 is data to be transmitted, data which has been received, a status word from the controller 10, or a command to the controller 10.

The control bus 82 comprises 5 lines, an initialising line INIT, for initialising the controller 10 whenever the signal thereon is logically true, a host action line 10B for signifying to the controller 10, whenever the signal thereon is logically true, that the host 12 is performing some function to which the controller 10 must respond, a request line 1 REQ/ by which the controller 10 signifies to the host 12, whenever the signal thereon is logically false, that host 12 response is required, and two data defining lines DIR/ and CONT/ which together, by their logical state, define whether the word on the data bus 80 is a command to the controller 10, received data, data for transmission, or status information read from registers within the controller 10.

The five lines of the control bus 82 are provided as input to a control decoder 84. The control decoder 84 provides one output for each of the conditions described above. Although the outputs of the decoder 84 are not shown coupled to other elements in the B-chip 66 it is to be understood that they are so coupled, in a manner which will become apparent.

The data bus 80 comprises eight lines I/O 0 to I/O 7 inclusively, which are coupled to the input/output controller 86.

The data bus 80 is in receipt of both data and commands from the host 12. Commands to the controller 10 are of two kinds. A first type of command, a direct command, is to be executed immediately. A second type of command, a queued command, is to be executed at some later time after the transmission of a selected data word and before the transmission of another. All commands, queued or direct, are distinguished from other signals on the data bus 80 by the action of the control decoder 86 which, by observing which of 4 possible states the DIR/ and the CONT/ lines of the control bus 82 are in, provides indication when the signal is a command. Queued commands are distinguished from direct commands by the queued command possessing a "1" in the most significant bit position on the I/O 7 line, and direct commands possessing a "0" in that position. Having thus far described the constructions of the B-chip 66, attention is drawn, for the meantime, away from FIG. 4 to FIG. 5.

FIG. 5 shows a first part of the transmit queue 24 of FIG. 2, and in particular, how data and direct and indirect commands are separated from one another, and how data and commands are stored.

The control decoder 86 provides a command line 90 which is logically true if and only if the incoming word on the data bus 80 is a command. The command bus 80 is provided as the input to a 32-byte 9-bit wide first-in first-out register 92. A first and gate 94 receives the most significant bit from I/O 7 of the data bus, as a first input and the command line 90 from the decoder 86 as a second input. If the most significant bit of the incoming word is a 1, and the command line 90 is true, then the incoming word is a queued command, and the first and gate 94 provides a logically true output which is provided as a ninth, parallel, binary digit on the flag input 95 of the queue 92 for storage, together with the word from the data bus 80, in the queue 92.

The most significant bit of the word on the data bus 80 on I/O 7 is inverted by a first inverter 96, whose output is logically true if the most significant bit is a zero. The output of the first inverter is provided as a first input to a second and gate 98 and the command line 90 from the command decoder 86 is provided as a second input to the second and gate 98. The output of the second and gate 98 is logically true if the command line 90 carries a logically true signal and the most significant bit of the word on the data bus 80 is zero, the combination of these conditions signifying that the word on the data bus 80 is a direct command for immediate execution by the controller 10.

The output of 98 of the queue 92 is provided as a first input to a signal selector 100 and the data bus 80 is provided as a second input to the selector 100. When the signal on a control input 102 to the selector 100 is logically true, the selector 100 provides, as its output, the signals on the data bus 80. When the signal on the control input 102 is logically false and the input on a selection input 103 is logically true, the selector 100 provides, as its output, the first eight bits of the output of the queue 92, ignoring the additional ninth bit provided at the input of the queue 92 by the first and gate 94.

As stated earlier, the queue 92 is a nine bit wide 32 byte long FIFO. Data may be loaded into the queue 92 from the host 12 and extracted under the clocking control of the T chip 70. The queue 92 is to be loaded whenever the incoming character on the data bus 80 is a queued command or data for transmission. The output of the first and gate 94 is provided as a first input to a first OR gate 104 and the transmit data line 106 from the control decoder 86 is provided as a second input to the first OR gate 104. Whenever the signal on the transmit data line 106 is logically true, it signifies that the word on the data bus 80 is to be transmitted. Whenever the output of the first and gate 94 is logically true it signifies that the word on the data bus 80 is a queued command. The output of the first OR gate 104 being logically true thus signifies that the word on the data bus 80 is either a queued command or a character for transmission and should be loaded into the queue 92.

A clock multiplexer 108 receives, as a first input, a clock signal from the host 12 on the host clock line 110, and, as a second input, a transmit clock signal on the transmit clock line 112 from the T-chip 68. The clock multiplexer 108 is responsive to the signal on a control input 114, provided by the output of the first OR gate 104, such that, when the output of the first OR gate 104 is logically true, the clock multiplexer 108 provides, as output, the host clock on the host clock line 110, and when logically false provides, as output, the transmit clock on the transmit clock line 112. The multiplexer 168 is also responsive to an inhibit signal, on an inhibiting input 116, provided by the output of the second and gate 98, such that, when the output of the second and gate 98 is true, that is, when the character on the data bus 80 is a direct command, the clock multiplexer 108 provides no output. The output of the multiplexer 108 is coupled, as clock signal on the clock input 88 of the queue 92. The multiplexer 108 thus provides, as output, the relevant clock signal for the operation of the queue 92 whenever the word on the data bus 80 is one that is to be loaded into or removed from the queue 92, and inhibits the clock signal to the queue 92 whenever the word on the data bus 80 is a direct command which is not to be loaded into the queue 92.

The queue 92 is a first-in first-out register of a kind which allows independent loading and unloading thereof. The output of the first OR gate 104 is provided as a mode controlling signal on a control input 120. When the output of the first OR gate 104 is logically true, signifying that the incoming word on the data bus 80 is to be loaded, the queue 92, loads the input word into the next vacant space behind data which has not yet been presented as output, and when the output of the first OR gate 104 is logically false, the queue 92 presents, as output, that stored word which has been therein for the longest time. The operation and construction of the queue 92 is explained in greater detail at a later stage.

As described earlier, the 8-bit word, stored in the queue 92 from the data bus 80, is presented as a first input to the selector 100 and the signal on the data bus 80 is presented as a second input thereto. The extra, ninth bit, generated by the first and gate 94 in response to the incoming word being a queued command and stored in parallel association in the queue with that word, is provided as the selection signal on the selection input 103 of the signal selector 100. Thus, as earlier described, the signal selector 100 provides, as its output, any direct command as it is received, or the character provided as output by the queue if it has associated therewith the ninth bit signifying that it is a queued command. In the event of a queued command and a direct command being simultaneously presented to the selector 100, the selector provides, as output, the direct command, the queued command being held over, at the output of the queue 92, until the second and gate 98 by providing a logically false output, indicates that the direct command has been accepted.

The output of the queue 92 is also provided as the input to a data gate 122. The ninth bit associated with each word retrieved from the output of the queue 92 is provided as a controlling input 124 to the data gate 122. Whenever the associated ninth bit is logically false, signifying that the word presented at the output of the queue 92 is a data word for transmission, the data gate 122 is opened, providing, as its output, the 8-bit word originally stored by the queue from the data bus 80 and subsequently provided as the output of the queue 92. Whenever the associated ninth bit is logically true, signifying that the word presented at the output of the queue 92 is a queued command, the data gate 122 is closed, providing no output.

In the above manner, queued data is separated from queued commands, and priority is given to direct commands. The exact implementation of such a separator may be varied in detail without departing the fundamental aspects of its operation.

The output of the selector 100 being the 8-bit word, either as originally stored in and subsequently retrieved from the queue 92 or received directly from the data bus 80, and in either case being a command word, is passed on for intermedate storage in the command holding register 126. The output of the data gate 122, being the 8-bit data word for transmission, originally stored in and retrieved from the queue 92, is passed on for further processing by the B-chip 66 and subsequent transmission via the T-chip 68 and the data link 14.

FIG. 5 shows, in schematic form, details of one possible method of construction of the queue 92.

A random access memory 128 is operable to receive and store up to 32 nine-bit words, each word being stored in a different selectable one out of 32, storage locations the particular location for each word being defined by a 5-bit address input word. The memory 128 is responsive to the signal on a read/write input 130 such that when the signal thereon is logically true the memory 128 accepts the word on the data bus 80 in parallel with the ninth bit from the output 65 of the first and gate 94 for storage in the location defined by the 5-bit address word, and when the signal on the read/write input 130 is logically false the memory 128 provides, as output, being the output of the queue 92, the word stored in the location defined by the 5-bit address word.

A 5-bit load counter 132 provides a 5-bit address, as output, for defining the location in the memory 128 where a word on the data bus 80 is to be stored. A 5-bit unload counter 134 provides, as output, a 5-bit address for defining the location in the memory 128 from which a word, stored in the memory 128, is to be retrieved and presented at the output 99 of the memory 128.

Both of the counters 132, 134 are rollover incrementing counters. The 5-bit address words, which are their outputs, are binary numbers which are incremented by 1 every time that counter 132, 134 receives a clock pulse. When each counter 132, 134 is in the state where its output is all ones, i.e. 11111, on receipt of the next pulse the output goes to all zeros, i.e. 00000, and thereafter, on receipt of subsequent clock pulse, goes through 00001, 00010, 00011 etc., back to 11111. Each of the counters 132, 134 may be forcibly reset such that the output is 00000.

The output of the load counter 132 is provided as a first input to an address multiplexer 136. The output of the unload counter 134 is provided as a second input to the address multiplexer 136. The address multiplexer 136 is responsive to the logical state of the signal presented at a control input 138 thereof such that when the signal thereon is logically true, the multiplexer 136 provides, as its output, the output of the load counter 132, and when the signal thereon is logically false, the multiplexer 136 provides, as its output, the output of the unload counter 134. The output of the multiplexer 136 is provided as the address defining input to the memory 128.

The clock signal to each of the counters 132, 134 is provided via the clock input 118 to the queue 92. The signal to the read/write input 130 of the memory 128 and to the control input 138 of the address multiplexer 136 is provided via the control input line 120 to the queue 92. The load counter 132 and the unload counter 134 are also in receipt of the signal on the control input 120 to the queue 92. When the signal on the transmit queue control input 120 is logically true, the load counter 132 is enabled such that its output is incrementable by clock pulses and the unload counter 134 is frozen. When the signal on the transmit queue control input 120 is logically false the unload counter 134 is enabled such that its output is incrementable in response to clock pulses and the load counter 132 is frozen.

Figure 4:
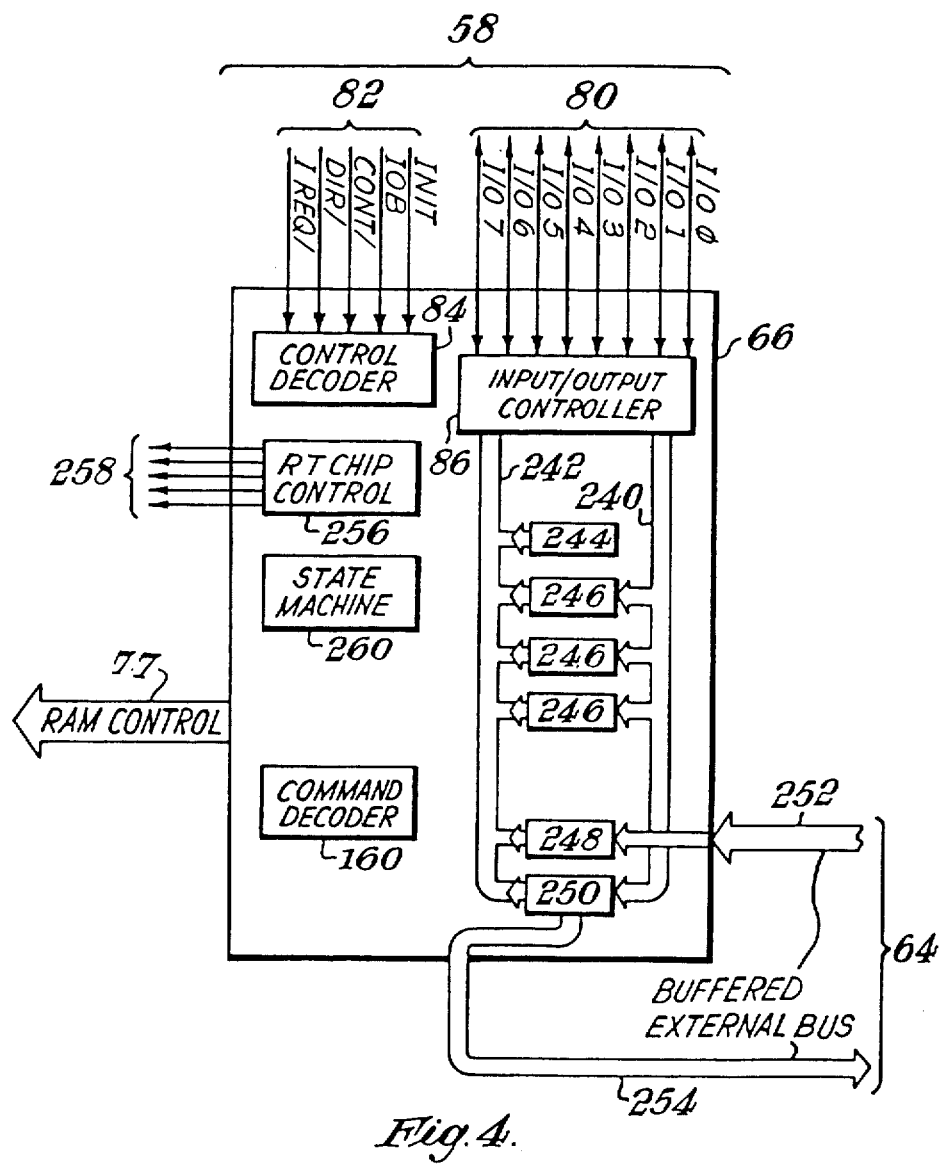
FIG. 4 shows a schematic representation of the control elements within the B-chip of FIG. 3.

Both the load counter 132 and the unload counter 134 are in receipt of the initialising signal INIT on the initialising line 140, from the control bus 82 of FIG. 4 and in response to the signal thereon being logically true, both counters 132, 134 are together reset such that both have the output state 00000.

A bidirectional 6-bit monitor counter 142 is in receipt of the clock signal from the clock input 118 to the queue 92, the initialising signal INIT from the initialising line 140, and the control signal from the control input 120 to the queue 92. The output of the monitor counter 142 is a 6-bit binary number which is incremented by 1 on receipt of a clock pulse when the signal on the queue control input 120 is logically true, decremented by 1 on receipt of a clock pulse when the signal on the queue control input 120 is logically false, and reset to 000000, regardless of other conditions, when the signal on the initialising line 140 is logically true.

The output of the monitor counter 142 is provided as the input to a decoder 144. The decoder 144 provides a first, logically true, output signal on the "empty" line 146 when the monitor counter's 142 output is 000000, i.e. zero, a second, logically true output signal on the "half full" line 148 when the monitor counter's 142 output is 010000, i.e. sixteen, and a third, logically true output signal on the "full" line 120 when the monitor counter's 142 output is equal to or greater than 100000, i.e. 32.

At the beginning of operations of the communications controller 10 the host 12 initialises the controller 10 by sending out a logically true signal on the initialising line (INIT) 140. This resets the contents of all counters and registers in the controller 10 to zero.

In the case of the queue 92, this has the effect of resetting the load counter 132, the unload counter 134 and the monitor counter 142 to zero. Thereafter, whenever a character is to be loaded in the memory 128, the signal on the control input 120 to the queue 92 is made logically true by the action of the first OR gate 104 of FIG. 4, the memory 128 responds by storing the character on the data bus 80, at the location designated by the output of the address multiplexer 136, which in this case, is the output of the load counter 132 and the load counter 132 and the monitor counter 142 are both incremented. The load counter 132 thus points to the next address in the memory 128 for the storage of the next character to be presented on the data bus 80, and the monitor counter 142 records the storing of another character in the memory 128 by having its count increased by 1.

Whenever a character is to be unloaded from the memory 128, the signal on the control input 120 to the queue 92 is made logically false by the action of the first OR gate 104 of FIG. 4. The address multiplexer 136, in response thereto, provides, as its output, the output of the unload counter 134, the unload counter 134 is enabled to be incremented by subsequent clock pulses, the load counter 132 is frozen, and the monitor counter 142 is enabled to be decremented by the next clock pulse.

In the event of the incoming word on the data bus 80 being a direct command, the clock multiplexer 108 of FIG. 4 is inhibited, by the action of the second and gate 98 of FIG. 4 from providing clock pulses on the clock input line 118 to the queue 92 and the unload counter 134 and the monitor counter 142 therefore remain unchanged. The same word will therefore be accessed from the memory 128, if required, after compliance with the direct command.

If no direct command is to be complied with, the word, stored in the location in the memory 128 determined by the output of the unload counter 134 is provided on the output 99 of the memory 128 and thereafter, the subsequent clock pulse on the clock line 118 increments the monitor counter 142 by 1.

The action of the monitor counter 142 is seen to be to keep a running tally of the number of unretrieved words stored in the memory 128. Whenever a word is stored in the memory 128 the monitor counter 142 is incremented, and whenever a word is retrieved from the memory 128 the monitor counter 142 is decremented. Since the monitor counter 142 is initialised to zero, its output counter equals the difference between the number of words, inserted into over the number of words retrieved from the memory 128.

As stated earlier, the memory 128 holds up to 32 words. The "empty" line 146 from the decoder 144, when it goes logically true, thus signifies that all words previously stored in the memory 128 have been retrieved therefrom. Similarly, a logically true signal on the "half full" line 148 signifies that there have been 16 more words deposited in the memory 128 than have been retrieved therefrom and the memory 128 is consequently, half full. In a like manner, a logically true signal on the full line 150 signifies that all of the memory 128 is full of unretrieved characters, and no more may be placed therein. The empty line 146, the half full line 148 and the full line 150 are coupled back to the host 12, as feedback indicative of the state of fulness of the transmit queue 24.

In use, the host 12 provides bursts of data and commands to the communications controller 10. The host 12 monitors the state of fullness of the transmit queue 24. Whenever the queue 24 reaches a selectable state of emptiness, either half full or empty according to the preference of the operational routine of the host 12, the host 12 provides a stream of data and/or commands until, in the case of a response to half-emptiness of the queue 24, the queue 62 is full, or less than full, or in the case of a response to emptiness of the queue 24, the queue 24 is selectably part full, half full or completely full. During the loading of data into the memory 128 the controlling clock is the host clock on the host clock line 110 of FIG. 5, and is very much faster than than the transmit clock on the transmit clock line 112 of FIG. 5, which is used to clock data at the slow rate required by the data link 14 of FIG. 1. The memory 128 is thus able to be replenished in a time which, in general, is less than one period of the signal on the transmit clock line 112 of FIG. 5, and the sending of a character by the data link 14 need not be omitted. In addition, the host 12 is only required to service its data link 14, via the communications controller 10, after the sending of 16 or 32 characters or indeed, however many characters, up to 32, which the host 12 choses to load, by the data link 14, thus leaving very long gaps during which the host 12 can attend to other data processing tasks.

Because the load counter 132 and the unload counter 134 are both rollover counters, as previously described, and the host 12 responds to predetermined levels of emptiness of the memory 128, the action of the queue 92 is to deposit new characters in locations in the memory 128 where they will be retrieved, in their serial order of deposition, immediately consecutively upon the retrieval of the last character already stored therein.

The mutual action of the load counter 132 and the unload counter 134 are best described by way of an example.

Imagine that all counters 132, 134, 136 are initially at zero. Imagine also that the host 12 elects to load the memory 128 with 21 characters at a time. In loading, the load counter 132 is incremented from 00000 to 10101, and the characters are stored in consecutive addresses 00000 to 10100 in the memory 128. The monitor counter 142 is also incremented from 00000 to 10101. When unloading, the unload counter 134 is incremented from 00000 to 10101, and characters are thereby retrieved from the memory 128 consecutively, in their order of loading, from consecutive addresses in the memory 128 00000 to 10100. Every time that a character is retrieved from the memory 128 the monitor counter 142 is decremented by 1. When the last character is retrieved from the memory 128, the monitor counter 142 stands at zero, and the decoder 144 signals to the host 12, via the empty line 146, that the transmit queue 24 is empty. Responding to this indication, the host 12 loads a further 21 characters.

The next 21 characters are loaded into locations in the memory 128 having addresses 10101 through to 11111, and thereafter 00000 to 10001, since the load counter 132 "rolls over" from 11111 to 00000. The new characters overwrite locations in the memory 128 previously occupied by members of the first set of characters, but this does not matter as the first set of characters have already been retrieved and will not be required again. In loading the characters the load counter 132 is incremented from 10101, the address in the memory 128 of the first member of the second set of characters, to 10010, the address for the storage of the first character in any subsequent set of characters to be stored. In retrieving the second set of characters from the memory 128, the unload counter 134 is incremented from 10101, the address of the first character of the second set, to 10010, the address of the first character in any subsequent set, and, in so doing, controls the retrieval, in the same serial order as that of their deposition, of characters stored in memory locations 10101 through to 11111 and thereafter from 00000 to 10001. As before, the monitor counter 142 is incremented, by loading, from 00000 to 10101 and decremented by unloading back to 00000, which condition is relayed back to the host 12.

It is thus seen that the load counter 132 and the unload counter 134 "chase each other round" their respective counting loops to achieve the data deposition and retrieval action previously described.

The queuing of data for transmission together with queued commands is of utility to the operation efficiency of the host 12. It is often the case that the mode of operation of the communications controller 10 requires to be altered subsequently to the transmission of a specific data character. By being able to queue that command immediately following the last data character to be sent under the former set of instructions and immediately preceding the first data character to be sent under the new set of instructions, the host 12 is relieved of the necessity of intervening to alter the instructions to the controller 10.

Commands to alter the state of the controller 10 consist of an instruction address word followed by one or more instruction words. The instruction address word specifies which of various registers is the destination of the following instructions word or words. Other commands tell the controller 10 to send back to the host 12 the contents of specified registers. The contents of the specified register will consist of one or more words. The host 12 provides a direct or queued "read register" command to the controller 10, and, subsequently to that command being recognised by the controller 10, the host 12 expects the next subsequent one or more words, the exact number depending upon which register was specified, appearing on the data bus 80, to be the contents of the specified register. At the same time, in order that the host 12 should be aware that the controller 10 is providing information, the controller 10 is required to indicate to the host 12, via the control bus 82, that it is providing data output. This last feature is most essential when dealing with queued commands in that the host 12 has no way of knowing, in advance of the instant when the command will be recognised by the controller 10.

It is also essential, when unloading queued commands from the transmit register 24, that the instruction address word or words are unloaded quickly enough that the sending of the following data word is not interferred with. To this end it is essential to provide a faster clock signal than the transmit clock signal to the queue 92 when an instruction has appeared at its output, so that it may be unloaded before the next request for a character by the data link 14.

In every case it is essential to know, upon recognition of the command, how many words following the instruction address word are in fact instruction words, or how many words are required to be sent back to the host 12.

Figure 7:
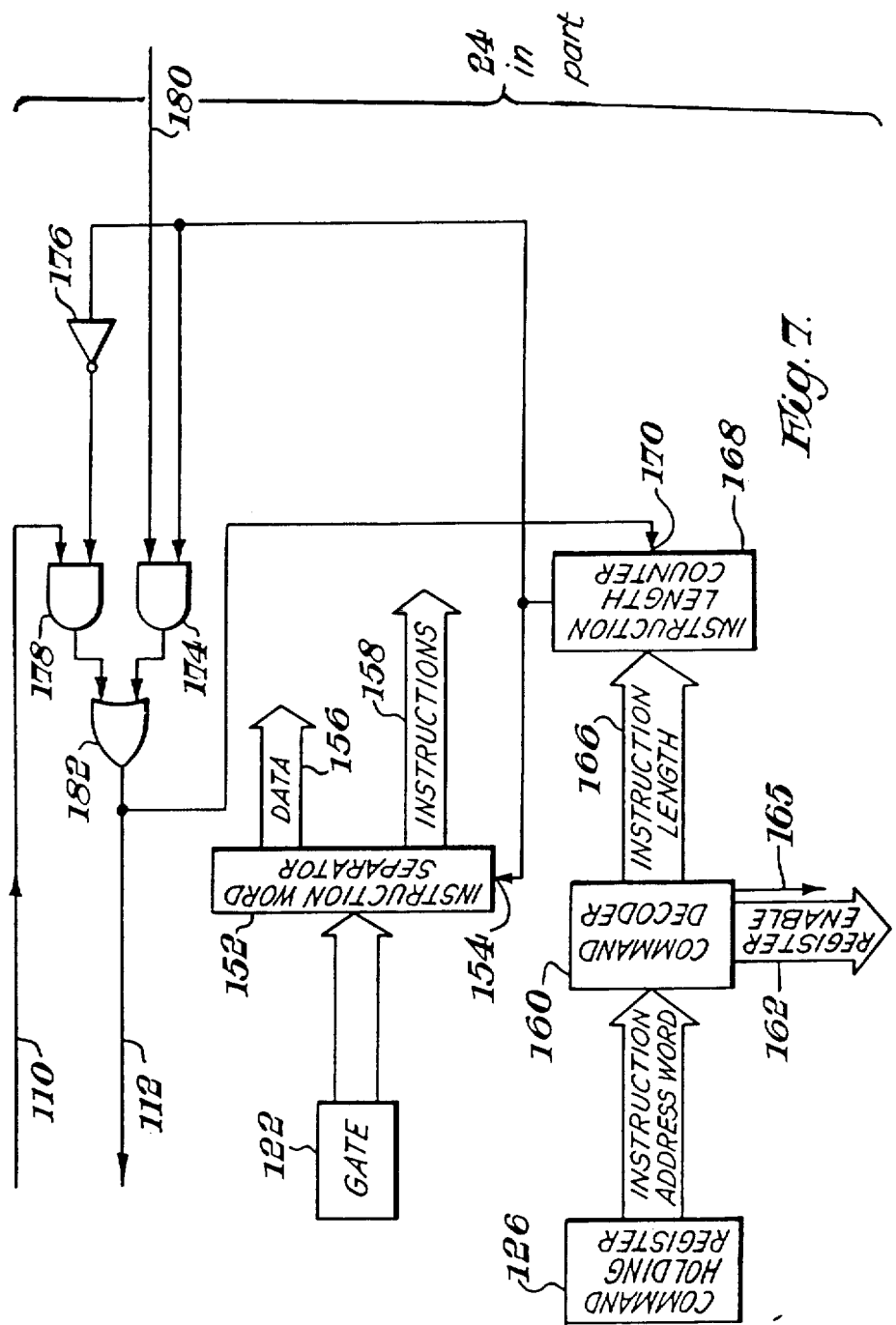
FIG. 7 shows a second and final part of the transmit queue of FIG. 2.

FIG. 7 shows a further and final part of the transmit queue 24 of FIG. 2, and in particular shows one method of implementing a circuit for achieving the above operations.

The data gate 122, previously shown in FIG. 5, passes its 8 bit parallel word output as an input to an instruction word separator 152. The separator 152 is responsive to the logical state of the signal on a selection input 154 thereof such that, when the signal is logically true it provides its input word on a data output bus 156, and when the signal is logically false, it provides its input word on an instruction output bus 158.

The command holding register 126, also previously shown in FIG. 5, provides, as its output, the command held therein, which output is coupled as the input to a command decoder 160. The command decoder 160 contains a predetermined list of all command codes. The command it receives is the instruction address word. The instruction words themselves are indistinguishable, other than by their position behind the instruction address word, from data for transmission, and therefore appear as an input to the separator 152.

The command decoder 160 examines its input and responds thereto by providing indication to the particular register specified by indicating whether data is to be deposited in or retrieved from that register, and by providing an output indicative of the number of instruction words that involves The indication to the particular register specified is made via the register enabling bus 162. The register enabling bus 162 comprises a plurality of lines, one line going to each addressable register. The line to the specified register is made logically true and thus enables that register alone to either receive new contents or provide its current contents as an output to the host 12.

The indication as to whether data is to be deposited in or retrieved from the specified register is provided via the deposit/retrieve line 165 which goes to all addressable registers. When the signal thereon is logically true, the specified register prepares to receive new contents, and when logically false, the specified register provides a copy of its current contents to the host 12.

The indication of the number of instruction words which are to follow the instruction address word is provided on an 8-bit instruction length bus 166 which provides the input, as a binary number, to an instruction length counter 168. The binary number so presented is equal to the number of following instruction words.

The instruction length counter 168 is in receipt of a clock signal on a clock input 170 thereof, and, when operational increments its count by 1 for each clock pulse. The length counter 168 is caused to become operational by the input it receives from the command decoder 160 becoming non-zero, and reverts to a non operational condition whenever its count once again becomes zero. The length counter 168 is re-armed by the presentation of another non-zero number from the decoder 160.

The length counter 168 uses the incoming number from the decoder 160 as a count limit. Whenever its count equals the incoming number, it resets itself back to zero, thus becoming non operational. The length counter 168 thus remains operational for a number of clock cycles equal to the number of instruction words following the instruction address word.

Whenever it is operational the instruction length counter 168 provides a controlling output which is logically false, and otherwise, logically true. The controlling output of the length counter 168 is coupled to the selection input 154 to the instruction word separator 152. Since the controlling output of the length counter 168 is logically false only while instruction words are being presented as the output of the gate 122, the selector 152 responds by providing the instruction words on the instruction output bus 158, and data words for transmission on the data output bus 156.

The controlling output of the length counter 168 is provided as a first input to a third and gate 174 and, via a second inverter 176, as the first input to a fourth and gate 178. The third and gate 174 is provided, as a second input, with the clock used to clock characters for transmission via the data link 14, via the data link clock line 180. The second and gate 178 is provided, as a second input, with the host clock signal from the host clock line 110, otherwise seen on FIG. 5. The output of the third and gate 174 is provided as a first input to a second OR gate 182 and the output of the fourth and gate 178 is provided as a second input to the second OR gate 182. The output of the second OR gate 182 is the transmission clock signal, provided on the transmission clock line 112 otherwise seen in FIG. 5. The output of the second OR gate 182 is provided as the clocking signal to the length counter 168.

Figure 6:
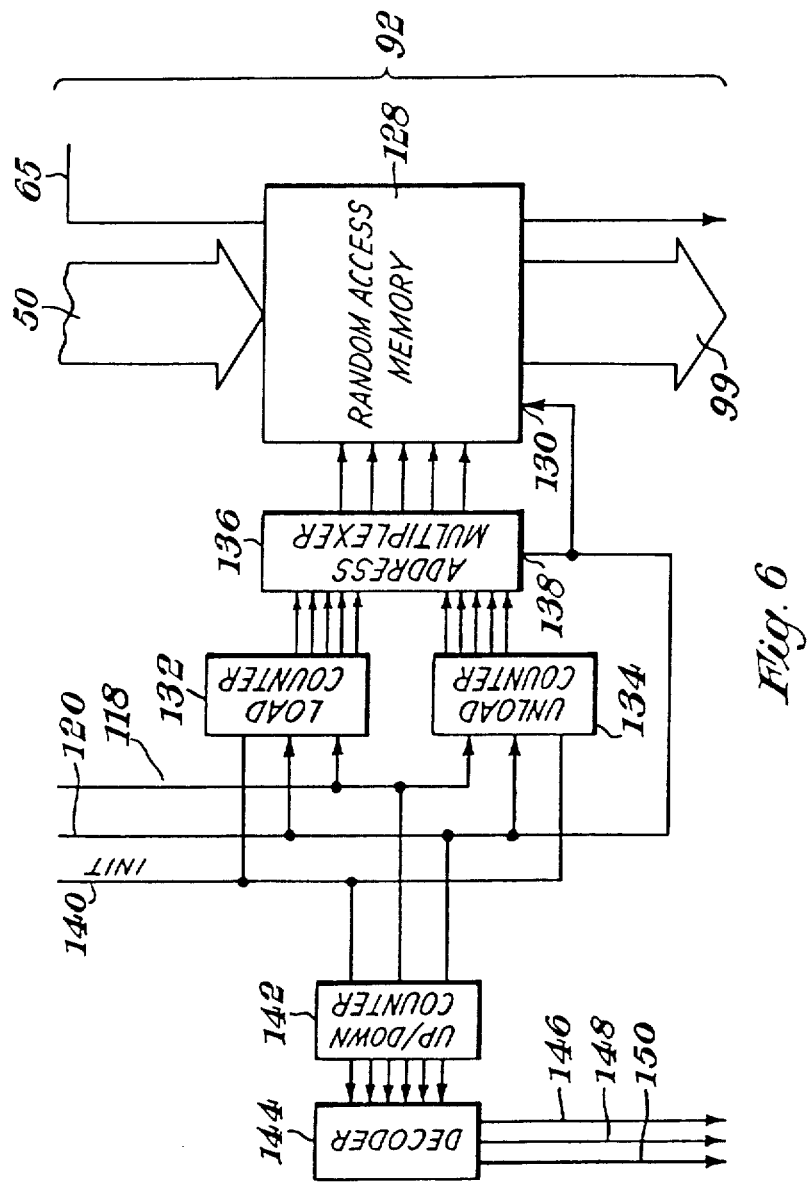
FIG. 6 shows the serial queue of FIG. 5.

Whenever an instruction address word is received by the command holding register 126, the length counter 168 is activated. Whenever the length counter 168 is activated, the clock signal provided at the output of the second OR gate 182, changes from that provided on the data link clock line 180 to the host clock line 110. The length counter 168 and the transmit queue 92 of FIGS. 5 and 6 are therefore clocked at the higher rate of the host clock. The instruction words, following the instruction address word, are then stripped out of the queue 92 in a very short time. When all of the instruction words have been so stripped, the length counter 168 becomes non-operational, and the queue 92 reverts to the data link clock ready to provide a character for transmission.

If the instruction address word is in the form of a direct command, the queue 92 will, as previously described, be paralysed. The host clock signal is once again used to clock the counter 168 and the instruction words, following the instruction address word on the data bus 80 are inserted into their signified register at high speed. It should be noted that, in order to automatically maintain the paralysis of the queue 92 during the receipt of instruction words following a direct command, it is necessary to provide the controlling output of the length counter 168, as a further output inhibiting input to the clock multiplexer 108 of FIG. 4. This must only occur during a direct command. The circuit for implementing this feature is not shown, but will be apparent to those skilled in the art.

Alternatively, the host 12 can maintain indication to the controller 10, via the control bus 82, that a direct command is being provided during the instruction words, so paralysing the queue 92.

It is to be appreciated that the circuit implementations shown in FIGS. 5 to 7 may be variously changed, modified, or otherwise implemented without departing from the functionality attributed thereto.

It is to be appreciated that all data, as opposed to commands, passes to and from the host 12 via the B-chip 66. Data, processed by the B-chip 66 prior to transmission, or to be received by the B-chip 66 for processing and passing on to the host 12, passes in and out of the B-chip 66 via the common bus 58 of FIG. 3. The B-chip 66 controls R-chip 70 and T-chip 68 access to the common bus 58. If a character is to be loaded into the T-chip 70 for transmission, the B-chip 66 issues a command to the T-chip 68 to accept that character into a register. Similarly, if a character is to be received from the R-chip 70, the B-chip 66 issues a command to the R-chip 70 to disgorge the contents of the register holding that character onto the data bus 80 of FIG. 3. During testing and initialisation, the host 12 is able to issue these commands directly to the T-chip 68 and the R-chip 70, but during normal operation these commands come only from the B-chip 66.

The T-chip 68 and the R-chip 70 both comprise command decoding elements similar in their operation and construction to the command decoder elements shown in FIGS. 5 and 6, with modifications, which will be apparent, to eliminate the queue 92. Both the T-chip 68 and the R-chip 70 receive only direct commands.

The T-chip 68 and the R-chip 70 are passive in that they generate no commands themselves, responding only to the host 12 and the B-chip 66. Certain signals are required to pass between the T-chip 68 and the R-chip 70, and since neither can independently commandeer the bus 58, these are passed via the T-R coupling 78 of FIG. 3.

It is to be appreciated that the above method of coupling data and commands between the chips 66, 68, 70 and the host 12, although preferred, is not exclusive. It is equally possible to cause the T-chip 68 and/or the R-chip 70 to be non-passive, so that they/it too can commandeer the bus 58. Similarly, data for transfer between chips 66, 68, 70 may be made via direct couplings, reserved exclusively therefor. Indeed, any structure which allows for the data flow of FIG. 2 is acceptable.

The receive queue 44 of FIG. 2, also in the B-chip 66, is similar to the queue 92 of FIGS. 5 and 6, with the exception that the memory 128 in the case of the receive queue 44 is operable to store 32 8-bit words as opposed to 9 bit words, that the memory 128 of the receive queue receives its data input from the translator 42 as opposed to the data bus 80, that the load counter 132 is incremented by the slow clock signal consistent with the rate of reception of characters from the data link 14, as opposed to the fast clock from the host 10, and that the unload counter 134 is incremented by the fast clock signal from the host 12 as opposed to the clock signal consistent with the rate of character transmission over the data link 14. The receive queue 44 is operated in just the same way as the queue 92, all of the counters 132, 134, 142 being initially reset, the decoder 144 providing indication to the host 12 of emptiness, half fullness or fullness, and the host 12 responding to the indications to extract received and processed characters from the receive queue 44 at intervals of up to 32 8-bit character reception periods. The host 12 is therby relieved of the necessity of attending to each received character in turn. Just as with the queue 92 of FIGS. 5 and 6, the receive queue 44 can be emptied as opposed to filled in a very short time, less than the period between successive received characters for loading therein, so that the flow of characters into the receive queue 44 is uninterrupted.

The receive serial queue 34 of FIG. 2 is also similar to the queue 92 of FIG. 6. In the serial receive queue 34 the memory 128, instead of storing 32 8-bit bytes stores 256 individual binary digits. The clock for both loading and unloading the receive serial queue 34 is the bit clock from the data link 14, which provides one pulse for each binary digit received. The memory 128 of the receive serial queue 34 has 256 single bit stores, and the load counter 132, and the unload counter 134 are both 8-bit rollover counters. The monitor counter 142 is a 9-bit counter as opposed to a 6-bit counter. The decoder 144, instead of supplying 3 indications, one at empty, one at full an one at half full, instead supplies indication of empty, full and more than full. The data input to the memory 138 is the single bit line from the data link 14 as opposed to the 8-bit wide data bus 80. The data input to the memory 128 comes via a gate which is closed in the event of a "more than full" indication i.e. an overflow indication. The output of the memory 128 is a serial bit stream. Initialisation and operation proceeds just as for the queue 92 of FIG. 6 and the receive queue 44 of FIG. 2, with the exception that, in this case, input and output are at the same speed.

Figure 8:
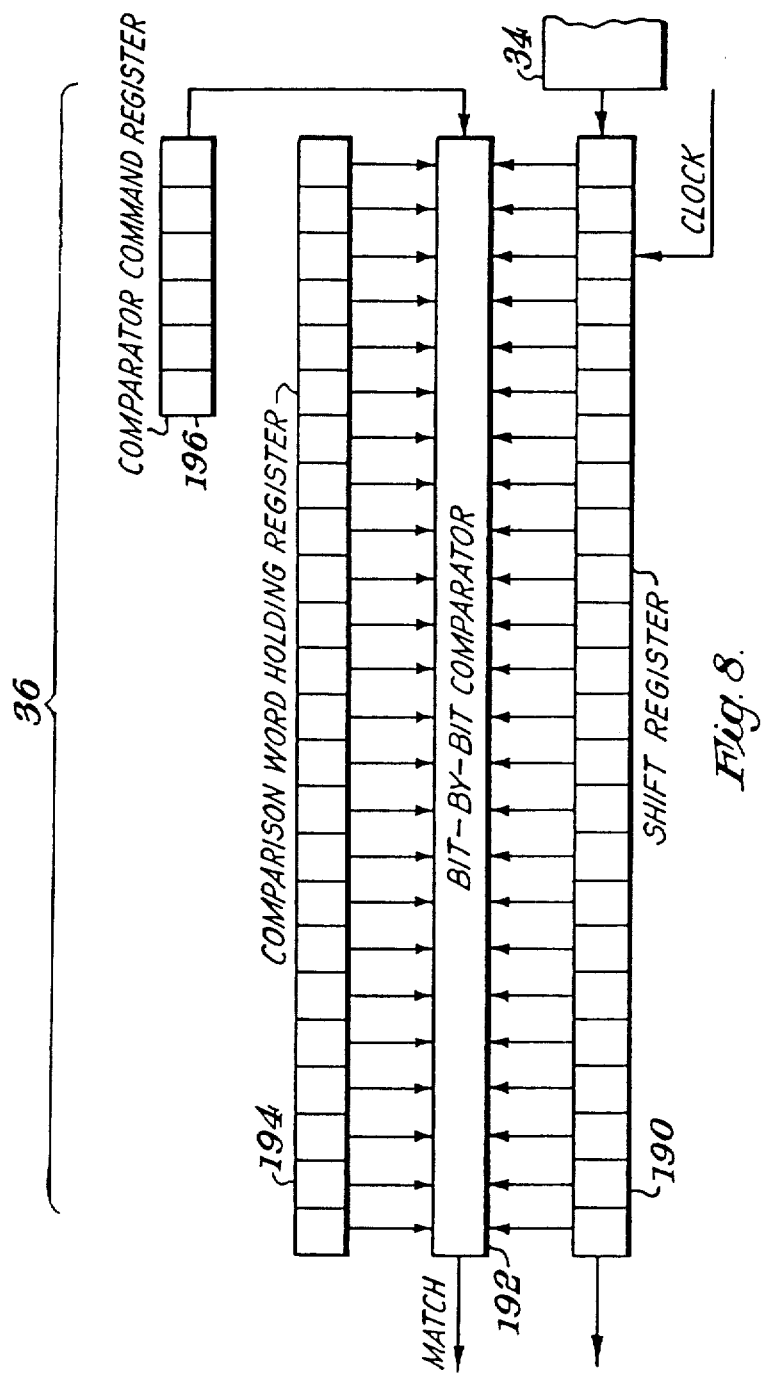
FIG. 8 shows the framing detector of FIG. 2.

FIG. 8 shows the framing detector 36 of FIG. 2.

The serial bit output of the receive serial queue 34 is provided as the input to a 24-bit long shaft register 190. The shift register 190 is clocked by the same clock used for the serial receive queue 34. At each clock pulse the bits in the register 190 move one place to the left, the leftmost bit being provided as the data output. The register, as shown, is sufficiently large for accepting up to 3 8-bit words. The length is of course a matter of design choice, and depends upon what protocols are to be used with the communications controller 10.

Each of the binary digits stored in the shift register 190 is provided as a first input to a bit-by-bit comparator 192. A 24-bit long static comparison word register 194 is pre-loaded by the host 12 with a pattern of binary digits corresponding to the incoming pattern from the receive serial queue 34 it is desired to detect. The contents of the comparison word register 194 are provided as a second input to the bit-by-bit comparator 192.

Whenever the contents of the shift register 190 are exactly the same, bit-by-corresponding-bit with those of the comparison register, 194, the comparator 192 provides a logically true output indicative of a match having been found. The comparison word is chosen to be some non-data word, such as a time-fill character. The leftmost bit of the comparison word corresponds to the first bit of the first byte of the character. When the match is found, it therefore indicates that the bit emerging as output from the shift register 190 is the first bit of a byte.

As a desirable refinement, the comparator 192 is made subject to the control of a comparator command register 196. The command register 196 is preloaded, by the host 12, firstly with a flag bit indicative of whether or not the comparator 192 is to be operational, and secondly with a five bit binary number indicative of the number of positions from the left of FIG. 8 over which the comparison is to be made. The comparator 192 responds by ignoring all mismatches to the right of the last position delineated by the binary number, and providing a match-indicating output only in the event of a match being found in all of the positions so delineated.

The framing detector's 36 data output is provided as a serial-bit-stream input to the serial-to-parallel converter 38 of FIG. 2 and the match indicating output of the detector 36 is provided as the synchronising input thereto.

The serial-to-parallel converter 38, as previously described, is operable, in response to the contents of a length register, pre-loaded by the host 12, to form its incoming serial stream into 8-bit or 5-bit words. Its output is always on an 8-bit wide bus. In the case of 5-bit wide words, the last 3-bit positions on its output are left empty. In construction it may be of any form known in the art, comprising, for example, a counter and a serial-in parallel out (SIPO) 8-bit long register. The input serial data stream is clocked into the SIPO register by the same clock as is used by both the receive serial queue 34 and the framing detector 36, the counter being incremented by the clock. Whenever the clock reaches a count of 6, in the case of a 5-bit long word, the counter, which is a 3-bit long counter, is reset to zero and in so doing causes the SIPO to provide its parallel output word. In the case of 8-bit long words the reset function is replaced by the rollover of the counter from 111 to 000.

The serial-to parallel converter 38 may be synchronised in various ways. In a first mode of operation it is never synchronised by the incoming data, but free runs forever having has its counter initially reset by the host 12. In a second mode of operation the clock input to the counter is frozen until a match is found. In a third mode of operation, whenever a match is found, the counter is forcibly reset to zero. These and other methods of synchronisation may be implemented using circuits familiar to those skilled in the art. The exact mode of synchronisation chosen is controlled by the contents of a synchronisation register pre-loaded by the host 12, and depends upon the coding and protocol then being used.

The resetting or rollover action of any counter used in the serial-to-parallel converter 38 provides a convenient clock signal source for byte clocking through the reception path 22.

The parallel-to-serial converter 30 of FIG. 2 operates in the reverse manner to the serial to parallel converter 38. Once again, it can be of any kind known in the art, comprising for example, a parallel-in-serial-out (PISO) register in conjunction with a 3-bit rollover counter, where the counter and the PISO register are both clocked by the bit clock used by the data link 14, where the counter is selectably operable, in response to the host 12 preloaded contents of a control register to either reset at a count of 6 or rollover from 111 to 000, where the rollover or reset action of the counter is usable as a byte-clocking signal in the transmission path, where the input to the PISO register is an 8-bit parallel word loaded by the reset or rollover action of the counter, where the output of the PISO is a serial bit stream, and where the counter is resettable to zero, by the host 12, to initialise its action. In the event of 5-bit words, the last 3-bit positions of the input are left vacant, and they are never clocked out.

Figure 9:
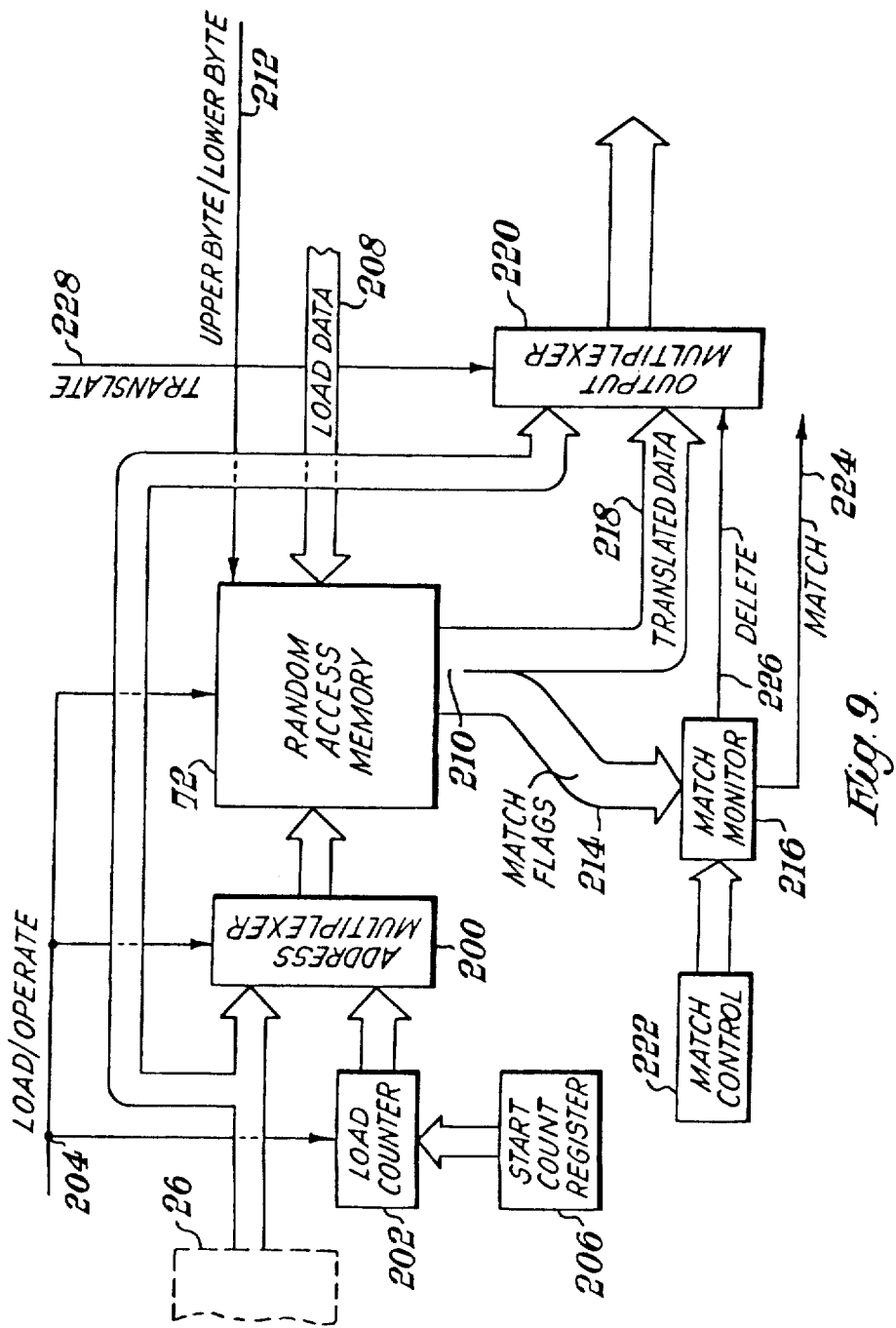
FIG. 9 shows a combined implementation of the translator and predetermined character monitor of FIG. 2.

FIG. 9 shows the preferred embodiment of the combined character monitor 40 and translator 42 of FIG. 2, it being understood that these items may be implemented separately.

The output of the CRC generator 26, being 8-bit wide data words from which the CRC characters have been deleted by the generator 26, are provided as a first input to an address multiplexer 200. An 8-bit counter 202, whose output is the address in the RAM 72 also shown in FIG. 3, where characters are to be deposited, is provided as a second input to the address multiplexer 200. The address multiplexer is controlled by the logical state of the signal on the load/operate line 204 such that, when the signal thereon is logically true, it provides, as output, the output of the counter 202 and when the signal thereon is logically false it provides, as output, the data word from the CRC generator 26.

The load counter 202 is also in receipt of the load/operate line 204 and is unit incremented by the host clock whenever the signal thereon is logically true.

The load counter 202 is settable to any predetermined 8 bit number in response to the contents of a start count register 206. The host 12 preloads the start number into the register 206. Thereafter, the counter 202 starts at that number whenever characters are being loaded into the RAM 72.

The output of the address multiplexer 200 is provided as the address input to the RAM 72. The RAM 72 is also in receipt of the load/operate line 204. Whenever the signal thereon is logically true, the RAM 72 loads the character on the load data bus 208 into the memory location defined by the address input, and whenever the signal thereon is logically false the RAM 72 provides, as output, on the RAM O/P bus 210, the word stored in the memory location defined by the address input.

The RAM 72 is a 256×12-bit store. In loading the RAM 72, the host 12 defines the start address for loading via the start counter register 202, and thereafter presents sequential words on the load data bus 208 for storage in sequentially adjacent locations in the RAM 72 under control of the load counter 202, after having caused the signal on the load/operate line 204 to be logically true.

It should be noted that the load/operate line 204 can be one of the output lines from the register enable output 162 of the command decoder 160 of FIG. 6, which responds to a command indicative of a desire to load the RAM 72. When it is desired to load the RAM 72 the command length is taken as the full length of the RAM 72, the host 12 cancelling that command by issuing another. Characters entering the communications controller 10 are only 8-bits wide. The problem of loading 12-bit bytes in the RAM 72 is overcome by dividing each location in the RAM 72 into an upper byte and a lower byte and loading them separately, but providing them as simultaneous output. This control is achieved by the upper/lower line 212 which can also be one of the register enable output lines 162 of the command decoder 160 of FIG. 6.

The contents of the RAM 72 comprises substitution characters, i.e. translated data, held in the memory addresses defined by the data characters, incoming from the CRC generator 26 which the substitution characters are intended to replace. The data characters from the CRC generator 26 are 8 bits wide, and thus can be used as unique addresses for each of the 256 storage location in the RAM 72. Each different incoming data character thus defines its own, unique, storage location, in the RAM 72. When the RAM 72 is not being loaded, the address multiplexer 200 provides, as the address to the RAM 72, the incoming data from the CRC generator 26. Each incoming data word addresses its own location in the RAM 72 wherein is stored its substitution character. The substitution character is provided as the output of the RAM 72. If a particular character is not to be translated, though other characters are to be translated, then the substitution character stored in the location in the RAM 72 addressed by that particular character is simply a copy of that particular character, so that the output of the RAM 72 is identical to its address input. If a particular character is to be translated, then the substitution character stored in the location in the RAM 72 addressed by that particular character is the translated version of that particular character, so that the output of the RAM 72 is different from its address input.

Match-indicating flags are stored in association with each substitution character. If the incoming character is one for which the controller 10 is to search, then one or more match flags are stored in the memory location in the RAM 72 which the incoming character addresses. The type of response required when a match is found is dependent upon the incoming character. As described earlier, it is sometimes desired to delete that character if it is a time-fill or other unwanted character, sometimes the character is definitive of an epoch in the received data for which one kind of action is required by the host 12, and sometimes the character received is an instruction to the receiving host. Those skilled in the art will be aware of other kinds of characters it might be desired to detect. Accordingly, each substitution character in the RAM 72 has associated therewith 4 flag bits. When a flag bit is a logical 1, it is indicative of the incoming character which addresses that memory location as being in a particular class for matching. An incoming word can thus belong to none of or all of 4 classes at once. In circumstances where more than 4 classes of match are required, it is of course possible to expand the number of match flags.

Whenever a substitution character is presented at the output of the RAM 72 its associated match flags are also so presented. The RAM O/P 210 is divided into two, a first part, the MATCH FLAGS output 214 being provided as input to a match monitor 216 and a second part, the TRANSLATED DATA output 218 being presented as a first input to an output multiplexer 220.

The match monitor 216 is controlled by the contents of a match control register 222 which is pre-loaded by the host 12. The match control register 222 determines which, if any, of the match flags the match monitor 216 is to be responsive to. If a match flag appears at the output of the RAM 72 to which the monitor 216 is to be responsive, then the monitor 216 provides indication to the host 12 that a match has been found via the match line 224. While the match line 224 is here shown as a single connection, it is to be appreciated that the match line 224 may carry indication to the host 12, of the kind of match which has been found. As described earlier, the signal or signals on the match line 224 are used, elsewhere in the controller 10, to stop the entire action of the controller 10 if certain characters are received and matched.

The match monitor 216 also provides an output, on the delete line 226, for deleting characters. When a character is transferred out of the RAM 72 and has associated therewith a match flag indicative of that character being unwanted by the host 12, the monitor 216 activates the delete line 226.

The incoming data word from the CRC generator 26 is also provided as a second input to the output multiplexer 220. The output multiplexer 220 is in receipt of a control signal on the TRANSLATE line 228, being the logical state of one bit of a register pre-loaded by the host 12. When the signal on the TRANSLATE line 228 is logically true, the output multiplexer 220 provides, as its output, its first input, namely the TRANSLATE DATA output 218 of the RAM 72, being the substitution character for the incoming data word. When the signal on the TRANSLATE line 228 is logically false, the output multiplexer 220 provides, as its output, its second input, namely the incoming data word itself from the CRC generator 26. The output multiplexer 220 is also in receipt of the delete signal on the delete line 226 from the match monitor 216, and responds thereto by proving no output if the delete line 226 is activated. The output of the multiplexer 220 is provided as the input to the receive queue 44 of FIG. 2.

In operation, the host 12 firstly loads the RAM 72 and instructions the match control register 216. Thereafter, when data is being received from the data link 14, the host 12 has the option of chosing whether or not to translate the incoming character, whether or not to delete the character, and whether or not to receive indication of predetermined matches. The host 12 may reload parts of the RAM 72 by setting the contents of the start count register 206 to the start address of a block load, and loading either a block or even just a single word as desired. The host 12 may read the contents of the RAM 72 in a similar manner, by the addition of elements, which will be apparent to those skilled in the art, whereby the contents of the RAM 72 may be retrieved under control from the counter 202.

It is to be appreciated that the above embodiment of the combined character monitor 40 and translator 42, although preferred in that it achieves its function in a time of the order of one clock cycle of the host clock, is not restrictive. It is known in the art to employ a memory and address counter having pre-defined start and stop counts to extract characters from the memory for bit-by-bit comparison with the character presented, and to indicate a match if any of the characters so retrieved from the memory passes the bit-by-bit comparison test. Other means are known for achieving character translation. The communications controller 10 functions regardless of the exact manner of implementation of the translator 42 and the character monitor 40 provided that they perform their function within the time of receipt of a byte (i.e. 5 or 8-bits) from the data link 14. The particular embodiment shown is advantageous in that it allows operation to proceed at the very highest bit reception rates, but for most land line purposes a slower speed of translation and/or matching would be acceptable.

The CRC generator 26 of FIG. 2 is any form of CRC generator, for the computation of the remainder resultant from the division of incoming, successions of parallel words by a polynominal. Various forms of such a device are known in the art. During transmission the CRC generator 26 calculates the remainder resultant from the division of the incoming stream of data characters for transmission over the data link 14, and when commanded, either directly or by a queued command, by the host 12, includes the remainder it has found as a further character for transmission and starts dividing again. During transmission the CRC generator 26 receives and divides the stream of received characters, again calculating the remainder, and when instructed, either by the host 12 or as a result of a match having been found, or, indeed as a result of having kept its own count compares the remainder it has found with the next character arriving, which is the CRC byte of the received characters. If there is a difference therebetween, the CRC generator 26 indicates to the host 12 that there has been an error in the received data. The CRC generator 26 does not pass on the CRC bytes of the received data, but deletes them from the received data stream by gating them out.

Although the CRC generator 26 of FIG. 2 is shown as operating on a succession of parallel words, CRC generators for operating on serial bit data streams are well known in the art. The CRC generator 26 might equally well be of this type, provided it is used in a portion of the transmission path 20 and of the reception path 22 where the data stream is serial. Equally well, the communications controller 10 might comprise two separate and independent cyclic redundancy checking circuits, one for the transmission path 20 and one for the reception path 22.

The polynomial used by the CRC generator 26 is selectable. The host 12 pre-selects the polynomial to be used by loading a selection register, which controls the CRC generator 26, with a polynomial selecting word. In the preferred embodiment, the selecting word instructs the CRC generator 26 to use a selected one of a plurality of polynomials already contained within the CRC generator 26, thus achieving an economy of instruction. Operational flexibility can be enhanced by arranging that the host 12 loads into the selection register the actual polynomial to be used. A combination of flexibility and instruction economy can be achieved by providing that the CRC generator 26 is selectably operable to respond either to a polynomial selection word in a selection register or to an actual polynomial presented by the host 12.

Returning once more to FIG. 3, showing a control schematic of the B-chip 66, the input/output controller 86 is responsive to load commands to provide commands, i.e. the new contents for registers, via the out bus 240. The destination register is uniquely enabled to receive new contents by the command decoder 160 shown in FIG. 6. Where a register holds more than one byte, the register itself automatically controls the deposition of characters into itself from the out bus 240, arranging that the first byte of a command is stored in a first position, the second byte of a command is stored in a second position, and so on.

The input/output controller 86 is also responsive to commands for reading the contents of registers to accept, on the in bus 242, the contents which the registers provide in response to control from the command decoder 160 and to provide the register output to the data bus 80. Multiple byte registers automatically provide their contents onto the in bus 242 as an automatically ordered succession of bytes.

The B-chip 66 comprises one or more status registers 244. The status register 244 is not pre-loadable from the out bus 240, but is cleared to all-zero contents when the host 12 initialises the communications controller 10. The contents of the status register 244 reflect conditions which are to be signalled back to the host 12.

The status register 244 has particular bits therein set, when, for example, a character match is found, a CRC or parity error has been detected, and so on. The host 12, by interrogating the contents of the status register 244, can thereby discover the status of the operation of the B-chip 66.

The B-chip 66 also comprises a plurality of control registers 246. These are the registers variously referred to in the previous descriptions. Whenever an operation is selectably controllable by the host 12, the host 12 achieves that control by loading the particular register 246 for controlling all or part of that operation with an appropriate control word. The contents of the registers 246 are accessible, for checking, when read out onto the in bus 242.

An external monitor register 248 and an external command register 250 allow for the monitoring of external equipment, and the control thereof, by the host 12, via the buffered external bus 64.

The buffered external bus 64 comprises an incoming bus 252 and an outgoing bus 254. The incoming bus 252 carries status and other feedback signals to the external monitor register 248 which automatically adopts them as its contents. The external monitor register 248 is not loadable by the host 12, but has its contents reset to zero when the host 12 initialises the communications controller 10. The contents of the external monitor register 248 are readable by the host 12 in the normal manner for all other registers, and thus provide a means for the host 12 to monitor the condition of external ancillary equipment. The outgoing bus 254 provides the contents of the external command register 250 as a control input to external equipment. The external command register 250 is loadable and readable by the host 12 in the normal manner described.

By use of the external monitor register 248 and the external command register 250, the host 12 is able to control the operation of any digitally controllable external, ancillary equipment. In the case of the preferred embodiment, these two registers 248, 250 are intended for use in controlling an automatic dialling unit so that the host 12 can call up or respond to any accessible landline link to any other remote host system that it desires. Those skilled in the art will appreciate that other equipment may be used. More than one set of monitor/control registers for more than one set of external equipment can be provided.

It was described earlier that the B-chip 66 controls the access of the T-chip 68 and the R-chip 70 to the common bus 58. This control is achieved by an R/T chip controller 256. The R/T chip controller 256 provides a modified control bus 258 for use by the control decoders (generically 84) in both the T-chip 68 and the R-chip 70, in place of the control bus 82 provided to the B-chip 66 by the host 12. The modified control bus 258 serves the same function as the control bus 82. It differs therefrom in that the provision of signals thereon is under the control of the B-chip 66.

A host initialisable state machine 260 controls the sequence of actions executed by the B-chip 66. The manner of operation of the B-chip 66 is made selectably dependent upon the particular communications protocol being used by the state machine 260 possessing a plurality of state sequences any one of which may be selected by the host 12 loading a control register 246 associated therewith with the desired state sequence selecting word.

The R/T chip controller 256 is responsive to the condition of the state machine 260. In some states of the state machine 260 the controller 256 allows the signals on the control bus 82 to pass onto the modified control bus 258. This allows the host 12 direct access to the R-chip 70 and the T-chip 68. In other states of the machine 260 the controller 256 generates commands, from the B-chip 66 to the T-chip 68 or the R-chip 70 for their control during transmission or reception.

The domination of the common bus 58 by the B-chip 66 is used to advantage by the provision of a LOCK command which the host 12 can issue to the B-chip 66 and in response whereto the B-chip 66 will accept no further commands itself nor enable either the T-chip 68 or the R-chip 70 to receive further commands until after the communications controller 10 has once more been initialised by the host 12.

The ability of all registers to be reset by the host 12, all of the registers to have their contents read by the host 12, and the contents of all control registers 246, 250 to have their contents determined by the host 12, is used by the host 12 in a test routine, performed outside of normal data reception or transmission, for testing the communications controller 10. Selectably host-operable gating, whose implementation will be apparent to those skilled in the art, is provided at the outputs and inputs of the data processing elements 24 through 44 of FIG. 2 so that they to may have their function monitored and so be tested by the host 12.

Figure 10:
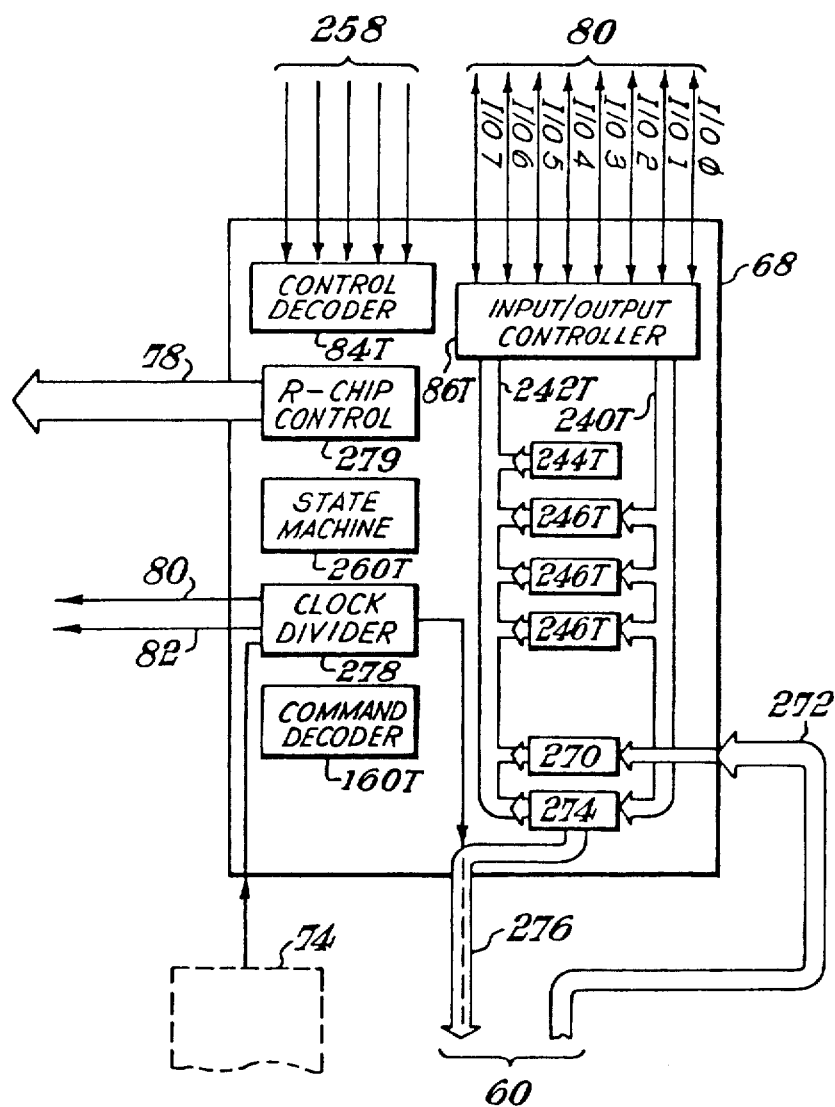
FIG. 10 shows a schematic representation of the control elements within the T-chip of FIG. 3.

FIG. 10 shows, in schematic form, the control structure of the T-chip 68.

A T-chip input output controller 86T functions with a T-chip out bus 240T, a T-chip in bus 242T, one or more T-chip status registers 244T, and a plurality of T-chip control registers 246T, in exactly the same manner as does the B-chip 66 with its corresponding elements. A data link monitor register 270, receiving status signals from the data link 14 on the incoming internal bus 272 of the internal data bus 60 corresponds to the external monitor register 248 of FIG. 4. A data link command register 274, for providing command signals to the data link 14 on the outgoing internal bus 276 corresponds to the external command register 250 of FIG. 4.

The T-chip 68 comprises its own command decoder 160T corresponding to the command decoder 160 (FIG. 4) in the B-chip 66 but operable to decode only those commands destined for the T-chip 68. The T-chip 68 also has its own control decoder 84T corresponding to that in the B-chip 66. The T-chip state machine 260T just like the B-chip state machine 260, operates in any host 12 selectable one out of a plurality of state sequences for the control of data flow in the T-chip 68.

As described before, the control decoder 84T of the T-chip 68 is identical to the control decoder 84 of the B-chip 66 with the exception that, instead of receiving its input from the control bus 82 linked to the host 12, it receives its input from the modified control bus 258 originating in and under the control of the B-chip 66.

The output of the crystal oscillator 74, a high-frequency clock signal, is coupled to the clock divider 278 as an input. The clock divider 278 contains first and second dividers. The first divider has a selectable ratio. The host 12 loads a control register 246T associated with the first divider with the number by which the frequency of the crystal oscillator 74 is to be divided. The first divider responds to the control number so loaded by so dividing the output of the crystal oscillator 74 for use as the transmission clock by the data link 14, and for use in bit and byte shifting in the rest of the communications controller 10. The clock divider 278 provides the bit and byte shifting clock signals as first and second, mutually quadrate clock signals on first and second clock lines 80, 82 for use as staggered clocks, as is very well known in the art, by both the B-chip 66 and the R-chip 70.

The transmission clock signal, together with serial data for transmission, is provided, additionally to control signals, to the data link 14, via the outgoing internal bus 276 of the internal data bus 60. Similarly, serial data received from the data link 14 is coupled, additionally to status signals, into the T-chip 68 via the incoming internal bus 272 of the internal data bus 60.

The second divider of the clock divider 278 divides the incoming frequency of the crystal oscillator 74 by a fixed, predetermined number to give a 1 KHz clock signal for use in timing operations.

The T-chip 68 comprises two general timers, not shown. Each of the timers is in receipt of the 1 KHz clock signal from the clock divider 278. The timers each comprise a counter and a numerical comparator. The host 12 loads a control register 246T associated with each timer with a binary number equal to the number of milliseconds the timing operation is to run. The contents of the associated control 246T register are coupled as a first input to the numerical comparator. The output of the counter is coupled as a second input to the numerical comparator. The host 12 resets one or both counters when it desires. Thereafter the output of the counters increments by 1 each millisecond. When the output of the counters equals the number from the control register 246T the numerical comparator provides indication to a status register 244T which the host 12 interrogates to become aware of the end of the timing operation.

Those skilled in the art will appreciate that such timers may be variously used by the host 12. The host 12 is relieve of keeping its own timing by the wasteful process of counting loops. The host 12 can, for example, start a timeout at commencement of a period of reception and use the timer to abort reception should it last too long without specific received data being apparent.

All signals to and from the data link 14 are coupled via the T-chip 68. The R-chip 70 requires some of these signals. Those signals required by the R-chip 70 are coupled thereto via the R-chip control 279 which provides signals to the R-T coupling 78. Thus received serial data signals, the 1 KHz clock signal, and some T-chip 68 status signals are so coupled.

It is sometimes required that the clock signal associated with the received data be regenerated. Types of signals, for data transmission of this nature comprise, for example, phase modulation, 5/4 code NRZ etc., and are well known. The clock divider 278 comprises a clock regeneration circuit, whose construction and operation will be apparent, which receives the received serial data stream as input and provides, as output, the required, regenerated clock which is provided in place of the selectably divided crystal-oscillator clock on the first and second clock lines 80, 82. The clock regenerators operation is selectably dependent upon a control word provided by the host 12 in a control register 246T associated therewith.

Figure 11:
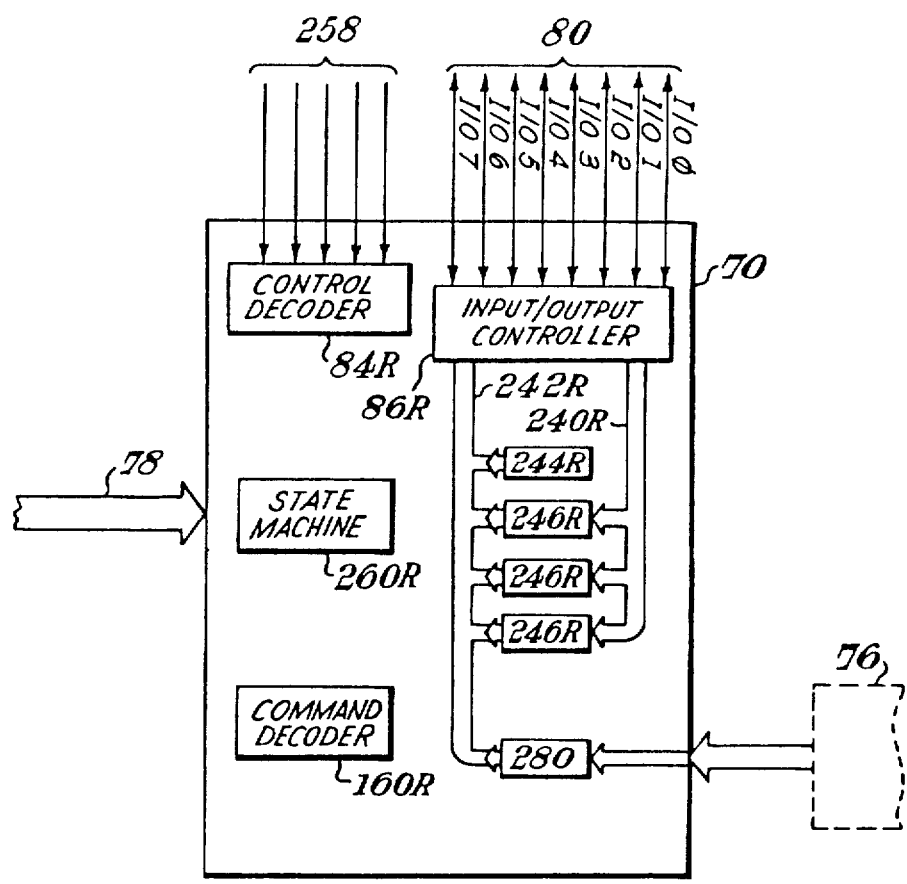
FIG. 11 shows a schematic representation of the control elements within the R-chip of FIG. 3.

FIG. 11 shows the control schematic of the R-chip 70.

The R-chip 70 comprises an input/output controller 86R, one or more status registers 244R, a plurality of control registers 246R, a control decoder 84R and a command decoder 160R, each of which is identical to the corresponding elements in the T-chip 68, with the exception that the R-chip command decoder 160R decodes only those commands destined for the R-chip 70. A switch register 280 receives, as input, the output of the identity switches 76, which output is operator selectable. The switch register 280 is readable by the host 12 so that the host 12 can know which communications controller 10 it is addressing. The R-chip state machine 260 corresponds to those in the T-chip 68 and the B-chip 66. The R-chip 70 receives incoming data and required clock signals via the R-T coupling 78. The R-chip 70 comprises a data timer, not shown. The data timer is similar to the first and second general purpose timers of the T-chip 68, with the exception that the counter therein is reset whenever a data character is received, so that indication is only provided to a status register 244R when there has been no data character received for a period longer than the host 12 selected number of milliseconds.

Figure 12:
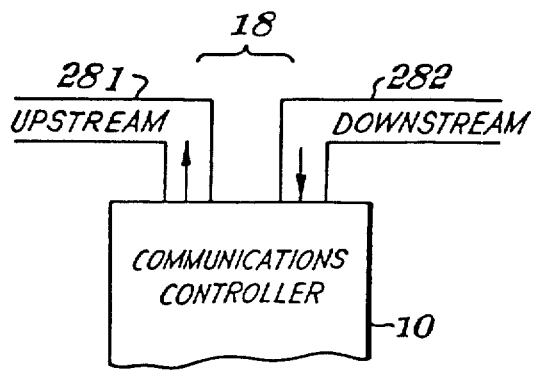
FIG. 12 shows the dual nature of the data link bus of FIG. 1.

FIG. 12 shows the structure of the data link bus 18 in conjunction with the communications controller 10.

The data link bus 18 comprises an upstream bus 280 and a downstream bus 282. Data signals and control signals can pass bidirectionally along each of these buses 280, 282. The communications controller 10 can communicate in either direction. Status signals (for example, indicative of a message being about to arrive,) can be received by the host 12 when it reads the data link monitor register 270 in the T-chip 68. Similarly, the host 12 can signal down either of these buses 280, 282, by loading an appropriate word in the data link control register 274 in the T-chip 68, that it is about to transmit or that it will accept an incoming message.

The upstream bus 280 is identical to the downstream bus 282, and the host 12 can selectably supply signals or respond to either of them.

When a single host 12 and a single communications controller operate via a data link 14, the data link 14 is coupled to only one of these buses 280, 282. Either of the buses is able to fulfil the signal and control needs of the data link 14.

Figure 13:
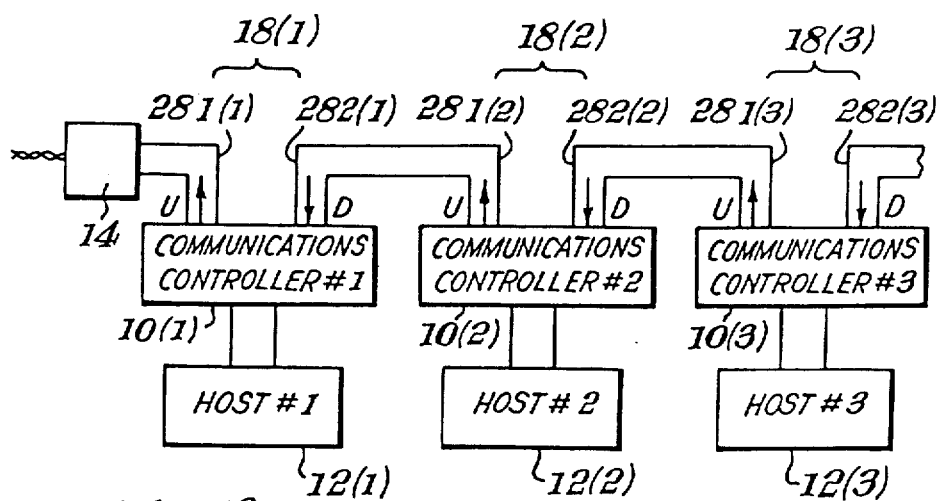
FIG. 13 shows a plurality of controllers coupling a corresponding plurality of hosts to one another and to a common data link.

FIG. 13 shows how a plurality of communications controllers 10 and hosts 12 can be intercoupled and further be commonly coupled to a single data link 14.

A first communications controller 10(1), associated with a first host 12(1) has its upstream bus 280(1) coupled to a data link 14 and its downstream bus 282(1) coupled to the upstream bus 280(2) of a second communications controller 10(2) associated with a second host 12(2). The downstream bus 282(2) of the second communications controller 10(2) is coupled to the upstream bus 280(3) associated with a third host 12(3). The downstream bus 282(3) of the third communications controller 10(3) can pass on to further communications controllers 10 to form a chain of any length. The final communications controller 10 in the chain can have its downstream bus 282 left unconnected, or indeed, coupled to a further data link 14. For the purposes of this description it is assumed that the final downstream bus 282 is left unconnected, although it will become clear how operation can be achieved with a second data link 14.

Each host 12(1), 12(2), 12(3) controls its respective communications controller 10(1), 10(2), 10(3). When a message is received from the data link 14 it is accepted by the first host 12(1). The message contains destination information. If the message is for the first host 12(1) nothing further happens and the first host 12(1) retains the information. If the message is destined for, say, the third host 12(3), the first host 12(1) resends the message, via the downstream bus 282(1) of the first communications controller 10(1) to the second host 12(2). The second host 12(2) recognises that the message is not for itself, and resends it, via the downstream bus 282(2) of the second communications controller 10(2) to the third host 12(3) where the message is recognised as having reached its destination and remains. Messages thus pass from host 12 to host 12 down the chain. The message need not have originated from the data link 14. Any host 12 can communicate with a host 12 of higher number by passing addressed messages along the chain as described.

When, for example, the third host 12(3) wishes to send a message via the data link 14, it passes the addressed message via the upstream bus 280(3) of the third communications controller 10(3) to the second host 12(2), the second host 12(2) passes the message via the upstream bus 280(2) of the second communications controller 10(2) to the first host 12(1), and the first host 12(1) passes the message via the upstream bus 280(1) of the first communications controller 10(1) to the data link 14. In this manner messages are passed from host 12 to host 12 up the chain. The message need not be destined for transmission by the data link 14. It can be any addressed message from a higher numbered host 12 to a lower number ed host 12. When the message arrives at its addressed destination, it is not passed on. In the example shown the data link 14 represents the lowest numbered element in the chain. If a second data link 14 is used at the other end of the chain the second data link represents the highest numbered element in the chain. A single communications controller 10 can operate between 2 data links 14.

In the example shown all lower numbered hosts 12 control the message transmission or reception of all higher numbered hosts 12, since the reception of a message by or passing on of a message originating in a higher numbered host 12 is dependent upon the attention given to the message by one or more lower numbered hosts 12. A kind of "daisy chain" thereby results wherein hosts 12 nearer the data link 14 have priority in access thereto over hosts 12 further away from the data link 14. The individual hosts 12 can, as will be apparent to those skilled in the art, be programmed for various refinements in message handling up and down the chain.

It is advantageous that certain conditions appertaining to the operation of the communications controller 10 detected therein for signalling to the host 12 are not left until the host 12 polls a status register 244, 244T, 244R (FIGS. 4, 11, 10) to be brought to the attention of the host 12. For example, should the data link 14 cease to function correctly during the transmission of a message, the message will require to be resent, as soon as possible, and before the host 12 may have discarded the message.

To this end, any status signals in the communications controller 10 which are to be communicated to the host 12 may be so communicated as a host 12 interrupt, so gaining immediate host attention in a manner well known in the art. The individual interrupt flags may be masked, in a manner also well known in the art, in response to a host 12 preloaded mask word in a control register 246 (FIG. 4), 246T (FIG. 10), 246R (FIG. 11) associated therewith.

We claim:

1. A communications controller for receiving and processing data from a data processor for use by a data link and for receiving and processing data from said link for use by said processor, said controller comprising;

a bus for receiving from said processor a mixed succession of data characters for transmission by said data link and command characters not for transmission by said data link, said command characters including a mixture of direct command characters for immediate, pre-emptive response thereto by said controller and queued command characters for response thereto by said controller subsequently to obeying the previously-received queued command character or to transmitting the previously received data character, a queue, coupled to receive said characters on said bus, operable to be advanced to store the character present on said bus or to deliver up a previously stored character, stored characters being delivered up in the same serial order as that of their receipt, coupled to receive a first indication, from said processor, that said character on said bus is a queued command character and operable to respond thereto to store a flag in association therewith, a gate, coupled to receive said delivered-up characters from said queue and operable in response to the receipt of said flag to separate out said queued command characters, and a multiplexer, coupled to receive, from said processor, said first indication, a second indication that the character on said bus is a direct command character and third indication that the character on said bus is a data character, coupled to respond to said flag, delivered up by said queue, coupled to receive a first, fast clock signal, coupled to receive a second clock signal whose rate is sympathetic to the rate of data transmission by said link, and operable to supply a queue clock signal for controlling the advancing of said queue, where when in receipt of said first indication, said multiplexer provides no queue clock signal, when in receipt of said second or said third indications said multiplexer provides said first, fast clock signal as said queue clock signal for the loading of the characters on said bus into said queue, when in receipt of said flag said multiplexer provides said first, fast clock signal as the queue clock signal for the rapid delivering up of a queued command from said queue, and when in receipt of none of said first, second or third indications nor of said flag said multiplexer provides said second clock signal as said queue clock signal for the delivering up of data characters for transmission by said link.

2. A communications controller according to claim 1 wherein each of said queued command characters and said direct command characters can comprise a plural succession of command words on said bus, said controller comprising;

a command decoder coupled to receive said direct commands from said bus and said queued commands from said gate, operable to decode the first word in any plural succession of command words to enable the register in said controller for which the command character is destined and to determine the number of command words in said plural succession of command words and to provide indication of said number, and a counter, coupled to receive said indication of said number from said decoder and operable to count and control the number of clock pulses issued to load said succession of command words into said destination register in response to said indication of said number.

3. A communications controller according to claim 2 comprising;

a plurality of readable registers, each operable to store one or more status words, where said decoder is operable to decode instructions from said data processor in the form of said direct command characters and of said queued command characters for the provision of the contents of selectable ones of said plurality of readable registers is serial succession onto said bus and to provide indication to said counter of the number of status words in the selected readable register for said counter to respond thereto to count and control the number of successive clock cycles administered for the presentation of the contents of said selected readable register onto said bus.

4. A communications controller according to claim 3 wherein said queue comprises;
- a random access memory for storing words in the queue in a location selected from among a plurality of locations by an address signal and for retrieving words from said selected location,
- a roll-over loading counter whose count is incremented for each new word stored in said random access memory and whose count is provided as said address signal when words are being loaded into said random access memory, and
- a roll-over unloading counter whose count is incremented for each word retrieved from said random access memory and whose count is provided as said address signal whenever words are being retrieved from said random access memory, where
- said loading counter and said unloading counter are in common receipt of said queue clock signal from said multiplexer and are both operable to have their count incremented thereby, and where
- the count on said loading counter and the count on said unloading counter are initializable to the same predetermined number prior to the commencement of operation of the queue.

5. A communications controller according to claim 4 wherein said queue comprises;
- an up/down counter, initialized to a count of zero when said load counter and said unload counter are initialized to each have a count equal to said predetermined number, incrementable upon each increment of said load counter and decrementable upon each increment of said unload counter for the count thereof to be equal to the number of words, stored in said queue, which have not yet been delivered up by said queue, and
- a count decoder, coupled to receive said count of said up/down counter as an input and operable to respond thereto to provide indication to said data processor of the queue being empty when said count of said up/down counter is zero, of said queue being full when said count of said up/down counter is equal to a maximum, predetermined number and of said queue being part full when said count of said up/down counter is equal to an intermediate predetermined number less than said maximum predetermined number.

6. A communications controller according to claim 5 comprising;
- a match-character store coupled to receive characters received from said data link and operable to monitor said received characters and to provide a selectable one from a plural predetermined set of substitute characters in place thereof in the event of the received character being in a predetermined stored set, said match-character store being operable to store, in association with each of said substitute characters, indication as to which out of a plural classification of matches said received character constitutes, and
- a match monitor, coupled to receive from said store said indication of the class of match and operable to provide indication to said data processor bus when a selectable class or match has been encountered.

7. A communications controller according to claim 6 wherein said match-character store is selectably operable to store one or more substitute characters identical to the corresponding received character or characters.

8. A communications controller according to claim 6 comprising;
- a multiplexer, coupled to receive said received characters from said data link as a first input, coupled to receive said substitute characters from said match character store as a second input, and selectably operable to provide said first input or said second input as output, where
- said match monitor is operable to autonomously identify a classification of match where said data processor requires a character to be suppressed and, in response thereto, to provide an inhibiting signal to said multiplexer, and where
- in response to the receipt of said inhibiting signal, said multiplexer is operable to provide no output.

9. A communications controller according to claim 8 wherein said match-character store is selectably operable to store one or more substitute characters identical to the corresponding received character or characters.

10. A communications controller according to claim 1 wherein said queue comprises;
- a random access memory for storing words in the queue in a location selected from among a plurality of locations by an address signal and for retrieving words from said selected location,
- a roll-over loading counter whose count is incremented for each new word stored in said random access memory and whose count is provided as said address signal when words are being loaded into said random access memory, and
- a roll-over unloading counter whose count is incremented for each word retrieved from said random access memory and whose count is provided as said address signal whenever words are being retrieved from said random access memory, where
- said loading counter and said unloading counter are in common receipt of said queue clock signal from said multiplexer and are both operable to have their count incremented thereby, and where
- the count on said loading counter and the count on said unloading counter are initializable to the same predetermined number prior to the commencement of operation of the queue.

11. A communications controller according to claim 10 wherein said queue comprises;
- an up/down counter, initialized to a count of zero when said load counter and said unload counter are initialized to each have a count equal to said predetermined number, incrementable upon each increment of said load counter and decrementable upon each increment of said unload counter for the count thereof to be equal to the number of words, stored in said queue, which have not yet been delivered up by said queue, and
- a count decoder, coupled to receive said count of said up/down counter as an input and operable to respond thereto to provide indication to said data processor of the queue being empty when said count to said up/down counter is zero, of said queue being full when said count of said up/down counter is equal to a maximum, predetermined number and of said queue being part full when said count of said up/down counter is equal to an intermediate predetermined number less than said maximum predetermined number.

12. A communications controller according to claim 11 comprising;
   a match-character store coupled to receive characters received from said data link and operable to monitor said received characters and to provide a selectable one from a plural predetermined set of substitute characters in place thereof in the event of the received character being in a predetermined stored set, said match-character store being operable to store, in association with each of said substitute characters, indication as to which out of a plural classification of matches said received character constitutes, and
   a match monitor, coupled to receive from said store said indication of the class of match and operable to provide indication to said data processor when a selectable class of match has been encountered.

13. A communications controller according to claim 12 wherein said match-character store is selectably operable to store one or more substitute characters identical to the corresponding received character or characters.

14. A communications controller according to claim 12 comprising;
   a multiplexer, coupled to receive said received characters from said data link as a first input, coupled to receive said substitute characters from said match character store as a second input, and selectably operable to provide said first input or said second input as output, where
   said match monitor is operable to autonomously identify a classification of match where said data processor requires a character to be suppressed and, in response thereto, to provide an inhibiting signal to said multiplexer, and where
   in response to the receipt of said inhibiting signal, said multiplexer is operable to provide no output.

15. A communications controller according to claim 14 wherein said match-character store is selectably operable to store one or more substitute characters identical to the corresponding received character or characters.

16. A communications controller according to claim 1 comprising;
   a match-character store coupled to receive characters received from said data link and operable to monitor said received characters and to provide a selectable one from a plural predetermined set of substitute characters in place thereof in the event of the received character being in a predetermined stored set, said match-character store being operable to store, in association with each of said substitute characters, indication as to which out of a plural classification of matches said received character constitutes, and
   a match monitor, coupled to receive from said store said indication of the class of match and operable to provide indication to said data processor when a selectable class of match has been encountered.

17. A communications controller according to claim 16 wherein said match-character store is selectably operable to store one or more substitute characters identical to the corresponding received character or characters.

18. A communications controller according to claim 16 comprising;
   a multiplexer, coupled to receive said received characters from said data link as a first input, coupled to receive said substitute characters from said match character store as a second input, and selectably operable to provide said first input or said second input as output, where
   said match monitor is operable to autonomously identify a classification of match where said data processor requires a character to be suppressed and, in response thereto, to provide an inhibiting signal to said multiplexer, and where
   in response to the receipt of said inhibiting signal, said multiplexer is operable to provide no output.

19. A communications controller according to claim 18 wherein said match-character store is selectably operable to store one or more substitute characters identical to the corresponding received character or characters.

* * * * *